(12) United States Patent  
Yamazaki et al.

(10) Patent No.: US 9,036,113 B2  
(45) Date of Patent: May 19, 2015

(54) LIQUID CRYSTAL DISPLAY DEVICE AND TELEVISION SET

(75) Inventors: Sachiko Yamazaki, Mobara (JP); Ikuko Imajo, Mobara (JP); Masashi Baba, Chiba (JP); Kikuo Ono, Naka (JP)

(73) Assignees: JAPAN DISPLAY INC., Tokyo (JP); PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 913 days.

(21) Appl. No.: 13/094,862

(22) Filed: Apr. 27, 2011

(65) Prior Publication Data

US 2011/0310078 A1    Dec. 22, 2011

Related U.S. Application Data

(63) Continuation of application No. PCT/JP2011/051308, filed on Jan. 25, 2011.

(30) Foreign Application Priority Data

Jun. 17, 2010 (JP) ................................. 2010-138555

(51) Int. Cl.
G02F 1/1335 (2006.01)

(52) U.S. Cl.
CPC .... G02F 1/133605 (2013.01); G02F 1/133603 (2013.01); *G02F 1/133608* (2013.01)

(58) Field of Classification Search
CPC ..................... G02F 1/133603; G02F 1/133605
USPC ................................................ 349/67, 62, 69
See application file for complete search history.

(56) References Cited

U.S. PATENT DOCUMENTS

| 7,436,000 | B2 * | 10/2008 | Kim et al. | 257/98 |
| 7,787,073 | B2 * | 8/2010 | Bang | 349/62 |
| 8,167,473 | B2 * | 5/2012 | Ahn | 362/606 |
| 8,550,646 | B2 * | 10/2013 | Kwon et al. | 362/97.3 |
| 2006/0203146 | A1 | 9/2006 | Bang | |
| 2006/0285326 | A1 | 12/2006 | Jeon | |
| 2010/0053956 | A1 | 3/2010 | Park et al. | |
| 2010/0271565 | A1 | 10/2010 | Suminoe et al. | |

FOREIGN PATENT DOCUMENTS

| JP | 10-126704 | 5/1998 |
| JP | 2003-172930 | 6/2003 |
| JP | 2005-228535 | 8/2005 |
| JP | 2006-244990 | 9/2006 |
| JP | 2006-259546 | 9/2006 |

(Continued)

*Primary Examiner* — James Dudek  
(74) *Attorney, Agent, or Firm* — Lowe Hauptman & Ham, LLP

(57) ABSTRACT

A backlight includes light emitting diodes; a substrate on which light emitting diodes are mounted; and a reflection sheet. The surface on which the light emitting diodes are mounted of the substrate is opposed to a rear surface of the liquid crystal display panel. The liquid crystal display panel and the substrate each have a shape in which a common width in a first direction is longer than a width in a second direction, which is orthogonal to the first direction. The width of the substrate in the second direction is shorter than the width of the liquid crystal display panel in the second direction. The substrate is opposed to, while avoiding being opposed to both end portions of the liquid crystal display panel in the second direction, a central portion between the both end portions of the liquid crystal display panel.

23 Claims, 28 Drawing Sheets

(56) References Cited

FOREIGN PATENT DOCUMENTS

| | | |
|---|---|---|
| JP | 2006-351540 | 12/2006 |
| JP | 2008-286955 | 11/2008 |
| JP | 2009-087879 | 4/2009 |
| JP | 2009-272451 | 11/2009 |
| JP | 2010-062006 | 3/2010 |
| JP | 2010-062556 | 3/2010 |
| JP | 2010-123551 | 6/2010 |
| KR | 2007-0118514 | 12/2007 |
| WO | WO 2009/016913 A1 | 2/2009 |

* cited by examiner

FIG.28
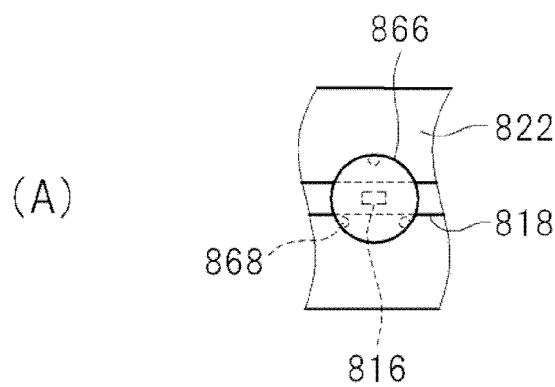
(A)
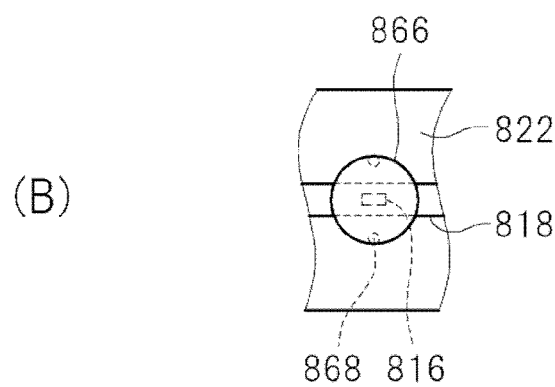
(B)
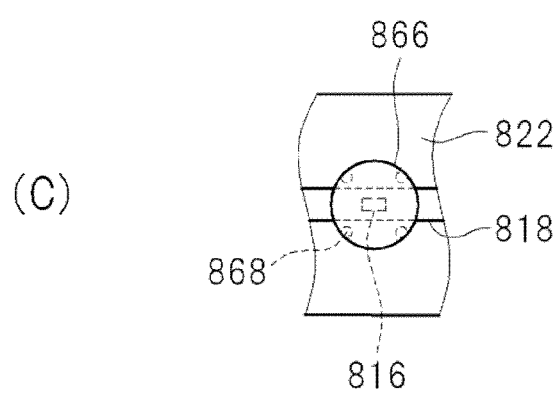
(C)

FIG.30
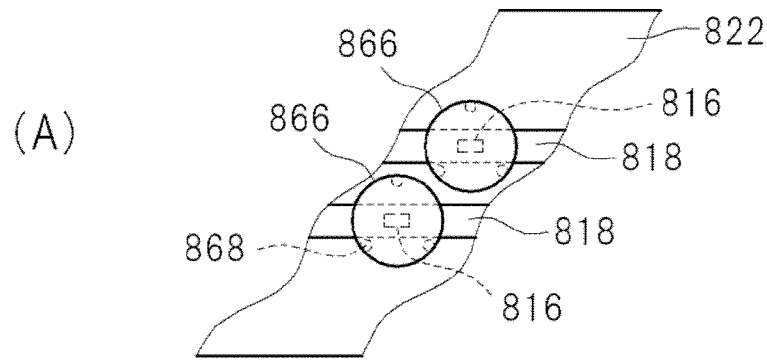
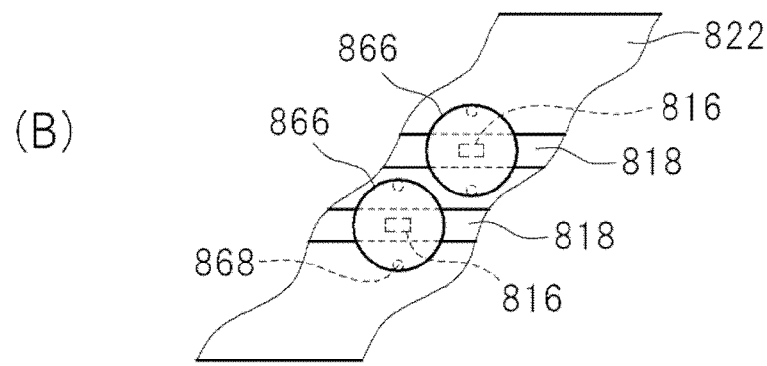
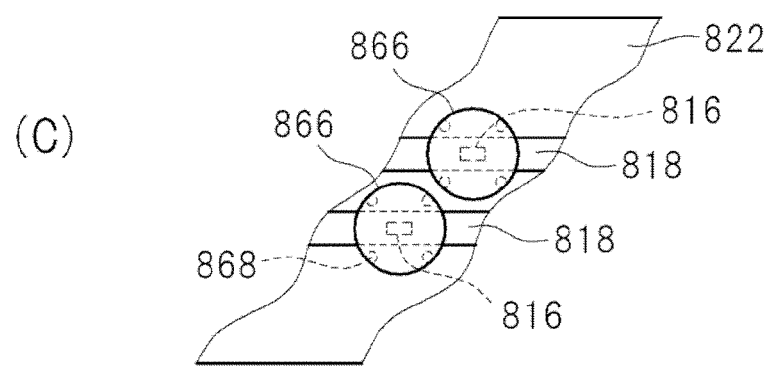

LIQUID CRYSTAL DISPLAY DEVICE AND TELEVISION SET

CROSS-REFERENCE TO RELATED APPLICATION

This application is a continuation application of International Application PCT/JP2011/051308, filed on Jan. 25, 2011, and designating the US. This application claims priority from Japanese application JP2010-138555 filed on Jun. 17, 2010, the content of which is hereby incorporated by reference into this application.

BACKGROUND OF THE INVENTION

1. Field of the Invention

The present invention relates to a liquid crystal display device and a television set.

2. Description of the Related Art

Light emitting diodes have become widely used as a light source of a backlight. For example, there is known an edge light type backlight in which, instead of cold-cathode tubes, light emitting diodes are disposed on an end surface of a light guide plate so as to enable surface emission by the light guide plate. Further, there is known an example using light emitting diodes in a direct type backlight (Japanese Patent Application Laid-open No. 2009-87879).

In a conventional direct type backlight, light emitting diodes are arranged in a region opposed to an entire surface of a liquid crystal display panel. Therefore, a large substrate for light emitting diodes is necessary, and hence it has been difficult to reduce the number of components to be used and to reduce cost.

SUMMARY OF THE INVENTION

The present invention has an object to provide a backlight in which a size of a substrate for light emitting diodes can be reduced and cost can be reduced, and a television set using the backlight.

(1) A liquid crystal display device according to the present invention includes: a liquid crystal display panel having a display surface and a rear surface, which is on a side opposite to the display surface; and a backlight, in which: the backlight includes: a plurality of light emitting diodes; a substrate on which the plurality of light emitting diodes are mounted; and a reflection sheet, which overlaps the substrate at a surface on which the plurality of light emitting diodes are mounted in a manner without overlapping the plurality of light emitting diodes; the surface on which the plurality of light emitting diodes are mounted of the substrate is opposed to the rear surface of the liquid crystal display panel; the liquid crystal display panel and the substrate each have a shape in which a common width in a first direction is longer than a width in a second direction, which is orthogonal to the first direction; and the width of the substrate in the second direction is shorter than the width of the liquid crystal display panel in the second direction, the substrate being opposed to, while avoiding being opposed to both end portions of the liquid crystal display panel in the second direction, a central portion between the both end portions of the liquid crystal display panel. According to the present invention, the substrate on which the light emitting diodes are mounted is small in size, and hence cost reduction is possible.

(2) In the liquid crystal display device as described in Item (1) of the present invention, the width of the substrate in the second direction may be one-third the width of the liquid crystal display panel in the second direction or less.

(3) In the liquid crystal display device as described in Item (1) or (2) of the present invention, each of the liquid crystal display panel and the substrate may have a rectangular shape which is long in the first direction.

(4) In the liquid crystal display device as described in any one of Items (1) to (3) of the present invention, the plurality of light emitting diodes may be arranged in a row in the first direction.

(5) In the liquid crystal display device as described in Item (4) of the present invention, pitches between adjacent light emitting diodes of the plurality of light emitting diodes may be equal.

(6) In the liquid crystal display device as described in Item (4) of the present invention, pitches between adjacent light emitting diodes of the plurality of light emitting diodes may be smaller as the adjacent light emitting diodes are closer to a center of the substrate in the first direction.

(7) In the liquid crystal display device as described in any one of Items (1) to (3) of the present invention, the plurality of light emitting diodes may be arranged in a staggered pattern in the first direction.

(8) In the liquid crystal display device as described in Item (7) of the present invention, pitches between adjacent light emitting diodes of the plurality of light emitting diodes in an arrangement direction of the staggered pattern may be equal.

(9) In the liquid crystal display device as described in Item (7) of the present invention, pitches between adjacent light emitting diodes of the plurality of light emitting diodes in an arrangement direction of the staggered pattern may be smaller as the adjacent light emitting diodes are closer to a center of the substrate in the first direction.

(10) In the liquid crystal display device as described in any one of Items (1) to (3) of the present invention, the plurality of light emitting diodes may include light emitting diodes in a first group, which are arranged in a row in the first direction, and light emitting diodes in a second group, which are arranged in a staggered pattern in the first direction.

(11) In the liquid crystal display device as described in Item (10) of the present invention: the light emitting diodes in the second group may be disposed at a central portion of the substrate in the first direction; and the light emitting diodes in the first group may be respectively disposed at both end portions of the substrate, which sandwich the central portion.

(12) In the liquid crystal display device as described in Item (11) of the present invention: the light emitting diodes in the first group may be arranged at equal pitches in the first direction; and the light emitting diodes in the second group may be arranged at equal pitches in an arrangement direction of the staggered pattern.

(13) In the liquid crystal display device as described in Item (11) of the present invention: pitches between adjacent light emitting diodes of the light emitting diodes in the first group may be smaller as the adjacent light emitting diodes are closer to a center of the substrate in the first direction; and pitches between adjacent light emitting diodes of the light emitting diodes in the second group in an arrangement direction of the staggered pattern may be smaller as the adjacent light emitting diodes are closer to the center of the substrate in the first direction.

(14) In the liquid crystal display device as described in any one of Items (11) to (13) of the present invention, a width of the substrate in the second direction at the central portion may be larger than a width of the substrate in the second direction at each of the both end portions.

(15) In the liquid crystal display device as described in any one of Items (1) to (3) of the present invention: pitches between adjacent light emitting diodes of the plurality of light emitting diodes may be smaller as the adjacent light emitting diodes are closer to a center of the substrate in the first direction; the substrate may be divided into a first divided substrate and a second divided substrate between adjacent light emitting diodes having a smallest pitch among the pitches; at least one of the first divided substrate and the second divided substrate may include, at one end portion of the at least one of the first divided substrate and the second divided substrate, a cable connector for connection to a cable; and the first divided substrate and the second divided substrate may be disposed so that another end portion of the first divided substrate and another end portion of the second divided substrate are adjacent to each other.

(16) In the liquid crystal display device as described in Item (15) of the present invention, the first divided substrate and the second divided substrate may have the same design, and have a positional relationship of rotation symmetry to each other.

(17) In the liquid crystal display device as described in Item (16) of the present invention: the another end portion of the first divided substrate and the another end portion of the second divided substrate may each have a recess portion and a convex portion at surfaces which are opposed to each other; and the first divided substrate and the second divided substrate may be disposed so that the recess portion of one divided substrate is opposed to the convex portion of another divided substrate.

(18) In the liquid crystal display device as described in Item (17) of the present invention: the plurality of light emitting diodes may be arranged in a staggered pattern in the first direction at least on the another end portion side of the first divided substrate, at which the recess portion and the convex portion are formed, and on the another end portion side of the second divided substrate, at which the recess portion and the convex portion are formed; and the convex portion may be protruded in the first direction from one of the plurality of light emitting diodes, which is positioned outermost in the first direction of each of the first divided substrate and the second divided substrate.

(19) In the liquid crystal display device as described in any one of Items (1) to (3) of the present invention: pitches between adjacent light emitting diodes of the plurality of light emitting diodes may be smaller as the adjacent light emitting diodes are closer to a center of the substrate in the first direction; the substrate may be divided into a first divided substrate and a second divided substrate between adjacent light emitting diodes provided at a position away from a position at which adjacent light emitting diodes having a smallest pitch among the pitches are provided; at least one of the first divided substrate and the second divided substrate may include, at one end portion of the at least one of the first divided substrate and the second divided substrate, a cable connector for connection to a cable; and the first divided substrate and the second divided substrate may be disposed so that another end portion of the first divided substrate and another end portion of the second divided substrate are adjacent to each other.

(20) In the liquid crystal display device as described in any one of Items (1) to (3) of the present invention: pitches between adjacent light emitting diodes of the plurality of light emitting diodes may be smaller as the adjacent light emitting diodes are closer to a center of the substrate in the first direction; the substrate may be divided into a first divided substrate, a second divided substrate, and a third divided substrate between adjacent light emitting diodes provided at positions away from a position at which adjacent light emitting diodes having a smallest pitch among the pitches are provided; and the liquid crystal display device may further include: a cable connector for connection to a cable, which is provided at one end portion of the first divided substrate; a first substrate connector for electrically connecting another end portion of the first divided substrate and one end portion of the second divided substrate; and a second substrate connector for electrically connecting another end portion of the second divided substrate and one end portion of the third divided substrate.

(21) In the liquid crystal display device as described in Item (20) of the present invention: the plurality of light emitting diodes may be arranged in a staggered pattern in the first direction; and the pitches between adjacent light emitting diodes of the plurality of light emitting diodes may correspond to pitches between adjacent light emitting diodes of the plurality of light emitting diodes in an arrangement direction of the staggered pattern.

(22) In the liquid crystal display device as described in Item (21) of the present invention: the another end portion of the first divided substrate and the one end portion of the second divided substrate, which are electrically connected to each other, may each have a recess portion and a convex portion at surfaces which are opposed to each other; the another end portion of the second divided substrate and the one end portion of the third divided substrate, which are electrically connected to each other, may each have a recess portion and a convex portion at surfaces which are opposed to each other; the convex portion may be protruded in the first direction from one of the plurality of light emitting diodes, which is positioned outermost in the first direction of each of the first divided substrate, the second divided substrate, and the third divided substrate; the first divided substrate and the second divided substrate may be disposed so that the recess portion of one divided substrate is opposed to the convex portion of another divided substrate; and the second divided substrate and the third divided substrate may be disposed so that the recess portion of one divided substrate is opposed to the convex portion of another divided substrate.

(23) In the liquid crystal display device as described in Item (20) of the present invention: light emitting diodes, which are disposed on the second divided substrate, of the plurality of light emitting diodes may be arranged in a staggered pattern in the first direction, and pitches between adjacent light emitting diodes of the light emitting diodes may correspond to pitches between adjacent light emitting diodes of the light emitting diodes in an arrangement direction of the staggered pattern; and light emitting diodes, which are disposed on the first divided substrate, and light emitting diodes, which are disposed on the third divided substrate, of the plurality of light emitting diodes may be respectively arranged in a row in the first direction.

(24) In the liquid crystal display device as described in Item (23) of the present invention, a width of the second divided substrate in the second direction may be larger than any one of a width of the first divided substrate in the second direction and a width of the third divided substrate in the second direction.

(25) In the liquid crystal display device as described in any one of Items (1) to (3) of the present invention: the backlight may include the reflection sheet as a first reflection sheet, and a second reflection sheet, which is adhered to the substrate; the first reflection sheet may include a plurality of first holes, which allow the plurality of light emitting diodes to be respectively disposed on inner sides of the first reflection sheet; the second reflection sheet may include, as a whole, a plurality of second holes, which allow the plurality of light emitting diodes to be respectively disposed on inner sides of the second reflection sheet; and on an inner side of each of the plurality of first holes, at least a part of an edge portion of corresponding one of the plurality of second holes may be exposed.

(26) In the liquid crystal display device as described in Item (25) of the present invention: the second reflection sheet may be divided into a plurality of reflection pieces; one of the plurality of reflection pieces may include one of the plurality of second holes, which allows one of the plurality of light emitting diodes to be disposed on an inner side of the one of the plurality of reflection pieces; pitches between adjacent light emitting diodes of the plurality of light emitting diodes may be smaller as the adjacent light emitting diodes are closer to a center of the substrate in the first direction; and each of the plurality of reflection pieces may be formed in such a size and a shape that, at a position corresponding to adjacent light emitting diodes having a smallest pitch among the pitches, adjacent reflection pieces are provided without overlapping each other.

(27) In the liquid crystal display device as described in Item (25) of the present invention: the second reflection sheet may be divided into a first reflection piece, which is disposed in a first region at a center of the substrate, and a plurality of second reflection pieces, which are disposed at a pair of second regions of the substrate, which sandwich the first region; and pitches between adjacent light emitting diodes of the plurality of light emitting diodes may be smaller as the adjacent light emitting diodes are closer to the center of the substrate in the first direction.

(28) In the liquid crystal display device as described in Item (27) of the present invention: the first reflection piece may include at least two of the plurality of second holes; and each of the plurality of second reflection pieces may include one of the plurality of second holes.

(29) In the liquid crystal display device as described in Item (27) of the present invention: the first reflection piece may include at least two of the plurality of second holes; and each of the plurality of second reflection pieces may include at least two of the plurality of second holes.

(30) In the liquid crystal display device as described in any one of Items (27) to (29) of the present invention, at least the light emitting diodes, which are disposed in the first region, may be arranged in a staggered pattern in the first direction.

(31) In the liquid crystal display device as described in Item (30) of the present invention, the light emitting diodes, which are disposed in the second region, may be arranged in a row in the first direction.

(32) In the liquid crystal display device as described in Item (25) of the present invention: the second reflection sheet may be divided into a plurality of reflection pieces; each of the plurality of reflection pieces may include at least two of the plurality of second holes, which allow at least two of the plurality of light emitting diodes to be disposed on inner sides of the at least two of the plurality of reflection pieces; the substrate may be divided into a plurality of divided substrates; and each of the plurality of reflection pieces may have an outer shape which is similar to one of the plurality of divided substrates to which corresponding one of the plurality of reflection pieces is adhered.

(33) In the liquid crystal display device as described in Item (25) of the present invention, the second reflection sheet may be formed by applying a white resist onto the substrate.

(34) In the liquid crystal display device as described in any one of Items (1) to (32) of the present invention: the liquid crystal display device may further include: a support plate, which supports the substrate on a side opposite to the plurality of light emitting diodes and is larger in size than the substrate; and a lens disposed above the substrate and above at least one of the plurality of light emitting diodes; and the lens may be attached to the support plate on an outer side of the substrate.

(35) In the liquid crystal display device as described in Item (34) of the present invention: the liquid crystal display device may further include a spacer provided on the support plate; and the lens may be supported by the support plate through intermediation of the spacer.

(36) In the liquid crystal display device as described in any one of Items (1) to (32) of the present invention: the liquid crystal display device may further include: a plurality of the substrates; a support plate, which supports the plurality of the substrates on a side opposite to the plurality of light emitting diodes and is larger in size than the plurality of the substrates; and a lens disposed above each of the plurality of the substrates and above at least one of the plurality of light emitting diodes; and each of the lenses may be attached to the support plate on an outer side of corresponding one of the plurality of the substrates.

(37) In the liquid crystal display device as described in Item (36) of the present invention: the liquid crystal display device may further include a spacer provided on the support plate; and the lenses may be supported by the support plate through intermediation of the spacer.

(38) In the liquid crystal display device as described in Item (37) of the present invention: the spacer may be disposed at least without being divided between adjacent substrates of the plurality of the substrates; and both of the lens positioned above one of the adjacent substrates and the lens positioned above another of the adjacent substrates may be supported by the spacer disposed between the adjacent substrates.

(39) In the liquid crystal display device as described in Item (37) of the present invention: the spacer may be divided into at least a first divided spacer and a second divided spacer between adjacent substrates of the plurality of the substrates, the first divided spacer being disposed near one of the adjacent substrates, the second divided spacer being disposed near another of the adjacent substrates; the lens positioned above the one of the adjacent substrates may be supported by the first divided spacer; and the lens positioned above the another of the adjacent substrates may be supported by the second divided spacer.

(40) In the liquid crystal display device as described in Item (1) of the present invention, the reflection sheet corresponding to a first reflection sheet may have a curved portion.

(41) A television set according to the present invention includes the liquid crystal display device according to any one of Items (1) to (40) of the present invention, the television set being formed so as to receive a radio wave for television broadcast to display an image and output sound.

(42) A television set according to the present invention includes: a liquid crystal display panel having a screen which is horizontally long; a backlight, which overlaps the liquid crystal display panel; a speaker; and a tuner, in which: the backlight includes: a reflection sheet having a curved portion so that a recess surface of the curved portion faces the liquid crystal display panel; a substrate on which the reflection sheet is overlapped on a side opposite to the liquid crystal display panel of the reflection sheet; and a plurality of point light sources, which are mounted on the substrate and disposed so as to protrude to the recess surface side while passing through the reflection sheet; each of the plurality of point light sources emits light in a perpendicular direction to the substrate and in other directions, the light emitted in the other directions being higher in intensity than the light emitted in the perpendicular direction; and the plurality of point light sources are arranged in at least one row in a horizontal direction of the screen, and arranged so as to be stored within a space region, which has a width in a vertical direction of the screen, the width being half a length of the screen in the vertical direction or less. According to the present invention, although the space occupied by the plurality of point light sources in the vertical direction of the screen is small, light is emitted so as to be spread, and smooth brightness change is caused by the curved portion of the reflection sheet. Therefore, a comfortable brightness distribution can be obtained.

(43) In the television set as described in Item (42) of the present invention, a width of the substrate in the vertical direction of the screen may be half the length of the screen in the vertical direction or less.

(44) In the television set as described in Item (42) of the present invention, the substrate may include a plurality of divided substrates which are arranged in the vertical direction of the screen.

(45) In the television set as described in Item (42) of the present invention: the curved portion of the reflection sheet may include a first curved portion and a second curved portion; and the first curved portion and the second curved portion may be formed on respective sides of the reflection sheet in the vertical direction of the screen while sandwiching the plurality of point light sources.

(46) In the television set as described in Item (42) of the present invention, each of the plurality of point light sources may include a light emitting diode and a lens disposed on an outer side of the light emitting diode.

(47) A television set according to the present invention includes: a liquid crystal display panel having a screen which is horizontally long; a backlight, which overlaps the liquid crystal display panel; a speaker; a tuner; and a cabinet for storing at least the liquid crystal display panel and the backlight, in which: the backlight includes: a reflection sheet having a curved portion so that a recess surface of the curved portion faces the liquid crystal display panel; a substrate on which the reflection sheet is overlapped on a side opposite to the liquid crystal display panel of the reflection sheet; and a plurality of point light sources, which are mounted on the substrate and disposed so as to protrude to the recess surface side while passing through the reflection sheet; the plurality of point light sources are arranged in at least one row in a horizontal direction of the screen; each of the plurality of point light sources emits light in a perpendicular direction to the substrate and in other directions, the light emitted in the other directions being higher in intensity than the light emitted in the perpendicular direction; and the substrate is fixed to the cabinet. According to the present invention, light is emitted so as to be spread, and smooth brightness change is caused by the curved portion of the reflection sheet. Therefore, a comfortable brightness distribution can be obtained, and thinning is achieved by fixing the substrate to the cabinet.

(48) In the television set as described in Item (47) of the present invention, the substrate may be directly fixed to the cabinet.

(49) In the television set as described in Item (47) of the present invention: the television set may further include a radiator plate to which the substrate is fixed; the radiator plate may be fixed to the cabinet; and the substrate may be fixed to the cabinet through intermediation of the radiator plate.

(50) In the television set as described in Item (47) of the present invention: the television set may further include a circuit board including circuits including the tuner; the curved portion of the reflection sheet may be disposed so as to be separated from the cabinet; and the circuit board may be disposed on a lower side of a space between the curved portion and the cabinet.

(51) In the television set as described in Item (47) of the present invention, each of the plurality of point light sources may include a light emitting diode and a lens disposed on an outer side of the light emitting diode.

BRIEF DESCRIPTION OF THE DRAWINGS

In the accompanying drawings:

FIGS. 28A to 28C are views each illustrating a backlight in a liquid crystal display device according to an eighth embodiment of the present invention;

FIGS. 30A to 30C are views each illustrating a second modified example of the backlight described in the eighth embodiment;

DETAILED DESCRIPTION OF THE INVENTION

Hereinafter, an embodiment mode of the present invention is described with reference to the drawings.
[Basic Structure]

Figure 1:
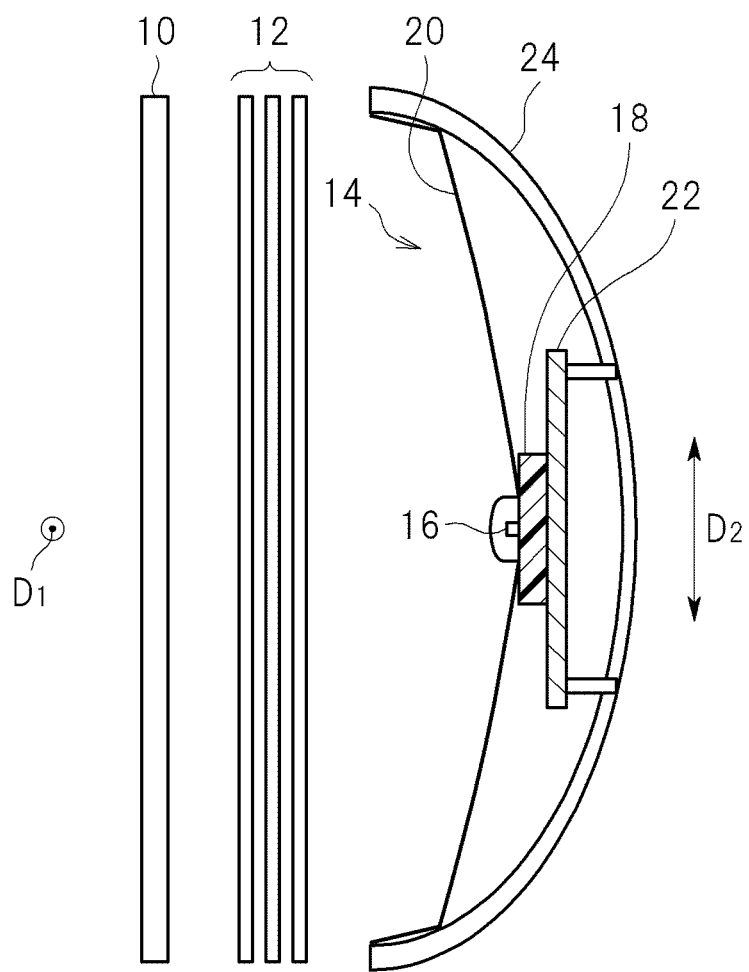
FIG. 1 is a cross-sectional view illustrating a basic structure of a liquid crystal display device according to an embodiment mode of the present invention.

FIG. 1 is a cross-sectional view illustrating a basic structure of a liquid crystal display device according to the embodiment mode of the present invention.

The liquid crystal display device includes a liquid crystal display panel 10. The liquid crystal display panel 10 has a display surface (left surface in FIG. 1) and a rear surface (right surface in FIG. 1), which is on a side opposite to the display surface. A plurality of optical sheets 12, such as a diffusion sheet and a prism sheet, are disposed so as to be opposed to the rear surface of the liquid crystal display panel 10.

Figure 2:
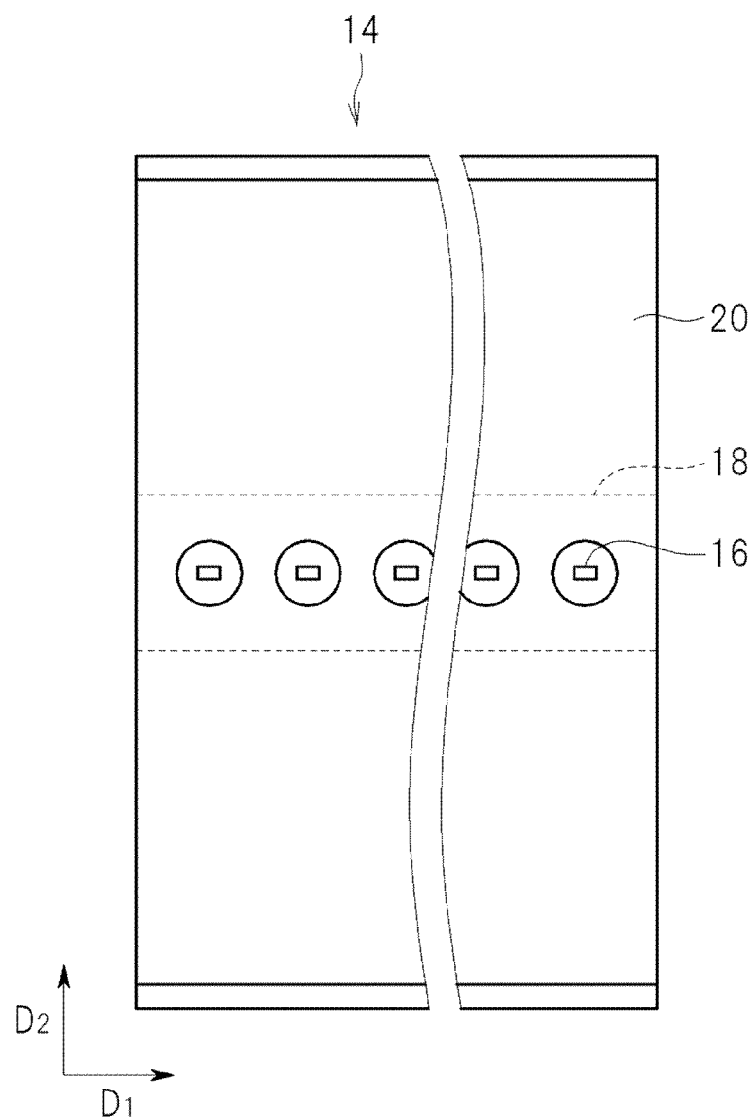
FIG. 2 is a plan view of a backlight.

The liquid crystal display device includes a backlight 14. FIG. 2 is a plan view of the backlight 14. The optical sheets 12 are disposed between the liquid crystal display panel 10 and the backlight 14. The backlight 14 includes a plurality of light emitting diodes 16 serving as light sources. The plurality of light emitting diodes 16 are mounted on a substrate 18 made of a glass epoxy resin or the like. The substrate 18 has a surface on which the plurality of light emitting diodes 16 are mounted, which is opposed to the rear surface (right surface in FIG. 1) of the liquid crystal display panel 10.

A reflection sheet 20 overlaps the substrate 18 at the surface on which the plurality of light emitting diodes 16 are mounted in a manner without overlapping the plurality of light emitting diodes 16. The reflection sheet 20 is larger in size than the substrate 18, and the entire substrate 18 is overlapped with a part of the reflection sheet 20. The reflection sheet 20 is made of, for example, a resin. The reflection sheet 20 is made of a material having a rate of thermal expansion that is different from that of the material of the substrate 18. The reflection sheet 20 has higher light reflectance than the surface of the substrate 18. As illustrated in FIG. 1, the reflection sheet 20 is folded or bent so as to avoid being parallel to the rear surface (right surface in FIG. 1) of the liquid crystal display panel 10. In this manner, directions of light beams reflected by the reflection sheet 20 are adjusted.

The substrate 18 on which the light emitting diodes 16 are mounted is attached to a support plate 22. The support plate 22 is fixed to a housing 24 on an inner side thereof. End portions of the reflection sheet 20 are attached to the inner side of the housing 24.

The liquid crystal display panel 10 and the substrate 18 each have a shape in which a common width in a first direction $D_1$ (front-and-rear direction of the sheet plane of FIG. 1 and right-and-left direction in FIG. 2) is longer than a width in a second direction $D_2$ (up-and-down direction in FIG. 1 or FIG. 2), which is orthogonal to the first direction $D_1$. For example, each of the liquid crystal display panel 10 and the substrate 18 has a rectangular shape which is long in the first direction $D_1$ in plan view.

As illustrated in FIG. 1, a width of the substrate 18 in the second direction $D_2$ is shorter than a width of the liquid crystal display panel 10 in the second direction $D_2$. The width of the substrate 18 in the second direction $D_2$ is one-third the width of the liquid crystal display panel 10 in the second direction $D_2$ or less. The substrate 18 is opposed to, while avoiding being opposed to both end portions of the liquid crystal display panel 10 in the second direction $D_2$, a central portion between the both end portions of the liquid crystal display panel 10.

According to this embodiment mode, the substrate 18 on which the light emitting diodes 16 are mounted is small in size, and hence it is possible to reduce cost and size of the backlight 14.

The contents described above about the basic structure correspond to any of embodiments described below.

First Embodiment

Figure 3:
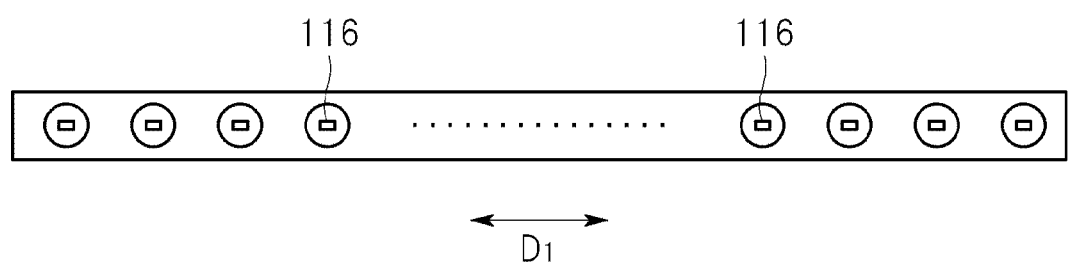
FIG. 3 is a view illustrating an arrangement of a plurality of light emitting diodes of a liquid crystal display device according to a first embodiment of the present invention.

FIG. 3 is a view illustrating an arrangement of a plurality of light emitting diodes of a liquid crystal display device according to a first embodiment of the present invention.

In this embodiment, a plurality of light emitting diodes 116 are arranged in a row in the first direction $D_1$. Further, pitches between adjacent light emitting diodes 116 are equal.

Figure 4:
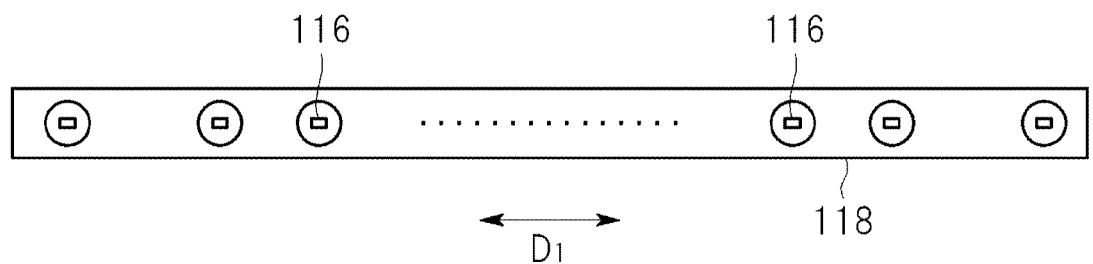
FIG. 4 is a view illustrating a modified example of the arrangement of the plurality of light emitting diodes described in the first embodiment.

FIG. 4 is a view illustrating a modified example of the arrangement of the plurality of light emitting diodes 116 described in the first embodiment. In this example, the plurality of light emitting diodes 116 are arranged at unequal pitches. Specifically, pitches between adjacent light emitting diodes 116 are smaller as the adjacent light emitting diodes 116 are closer to a center of a substrate 118 in the first direction $D_1$.

Second Embodiment

Figure 5:
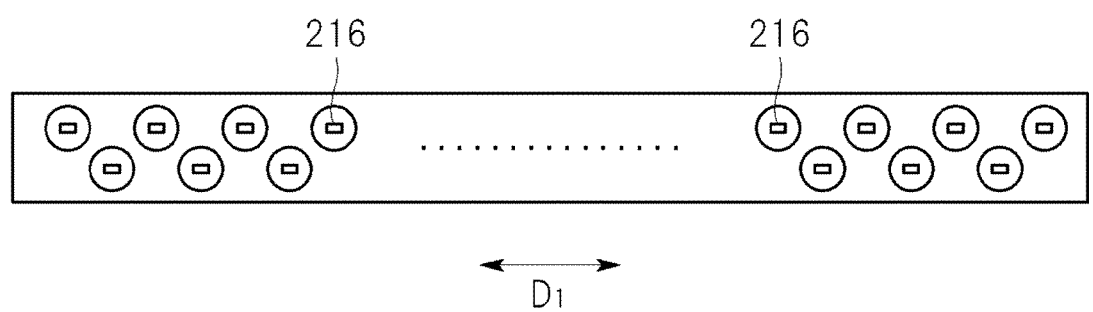
FIG. 5 is a view illustrating an arrangement of a plurality of light emitting diodes of a liquid crystal display device according to a second embodiment of the present invention.

FIG. 5 is a view illustrating an arrangement of a plurality of light emitting diodes of a liquid crystal display device according to a second embodiment of the present invention.

In this embodiment, a plurality of light emitting diodes 216 are arranged in a staggered (zigzag) pattern in the first direction $D_1$. Further, pitches between adjacent (obliquely adjacent) light emitting diodes 216 in an arrangement direction of the staggered pattern are equal.

Figure 6:
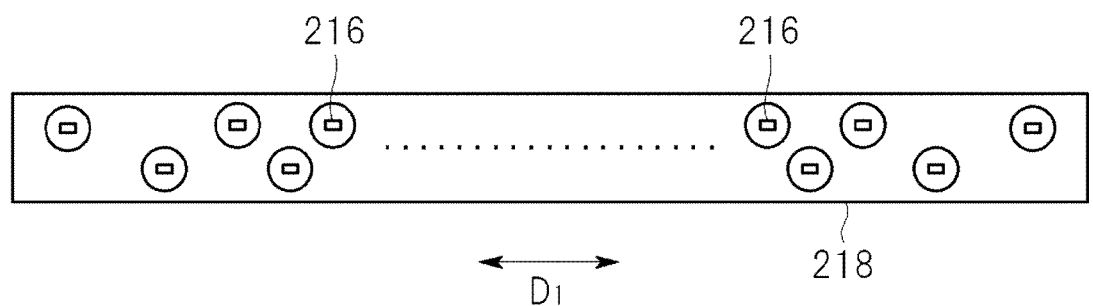
FIG. 6 is a view illustrating a modified example of the arrangement of the plurality of light emitting diodes described in the second embodiment.

FIG. 6 is a view illustrating a modified example of the arrangement of the plurality of light emitting diodes 216 described in the second embodiment. In this example, the plurality of light emitting diodes 216 are arranged at unequal pitches. For example, pitches between adjacent light emitting diodes 216 in the arrangement direction of the staggered pattern are smaller near a center of a substrate 218 in the first direction $D_1$, and are larger near end portions of the substrate 218.

Figure 7:
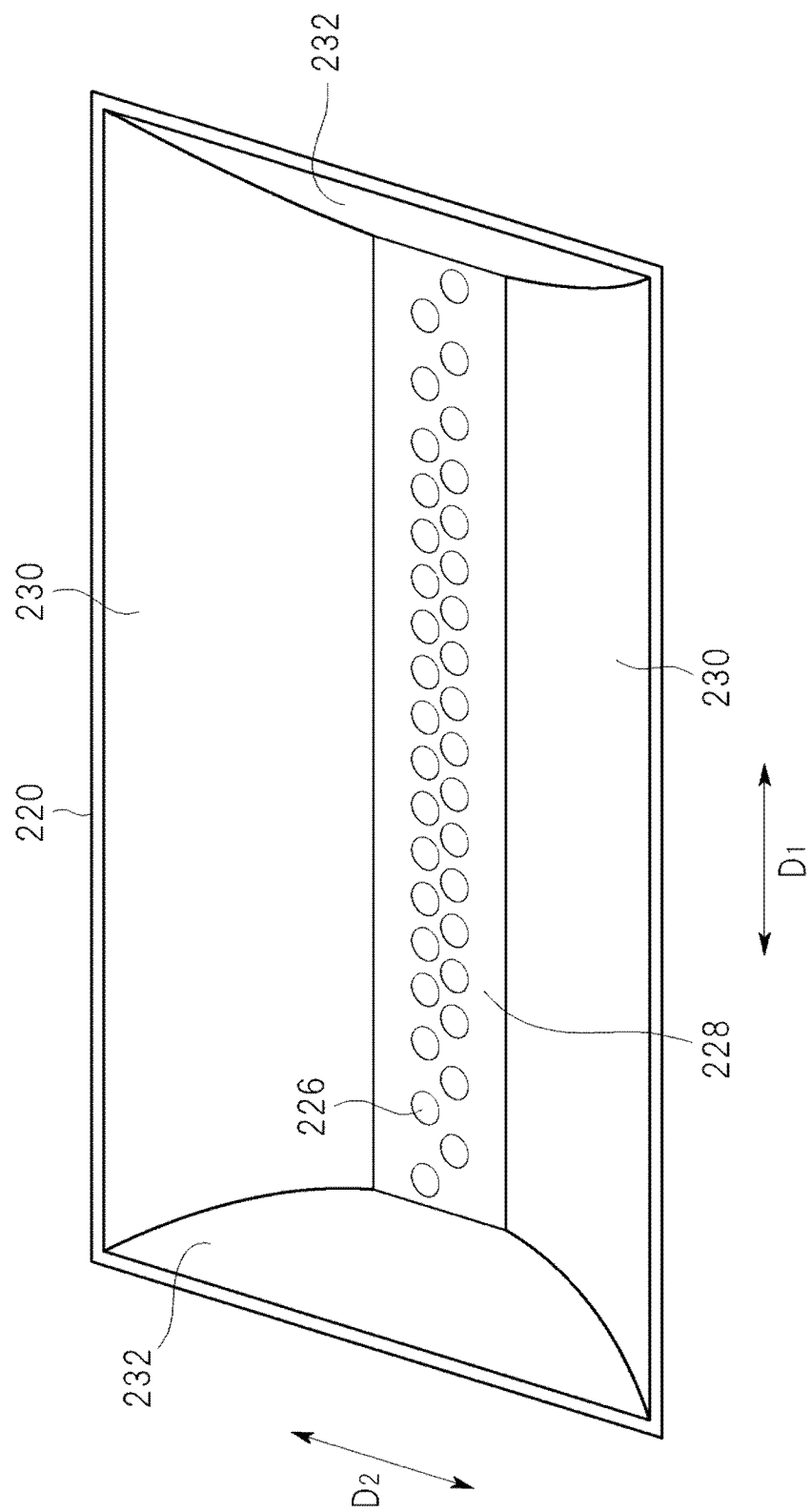
FIG. 7 is a view illustrating a reflection sheet, which corresponds to the structure in which the light emitting diodes are arranged as illustrated in FIG. 6.

FIG. 7 is a view illustrating a reflection sheet 220, which corresponds to the structure in which the light emitting diodes 216 are arranged as illustrated in FIG. 6. The reflection sheet 220 has a plurality of holes 226 formed therein so as to dispose the plurality of light emitting diodes 216 one by one on the inner side thereof. The plurality of holes 226 correspond to the arrangement of the light emitting diodes 216 illustrated in FIG. 6, and are arranged in a staggered pattern in the first direction $D_1$. The plurality of holes 226 are arranged at unequal pitches. Specifically, pitches between adjacent holes 226 in the arrangement direction of the staggered pattern are smaller as the adjacent holes 226 are closer to the center of the substrate 218 in the first direction $D_1$.

The reflection sheet 220 has a flat region 228, which is opposed and parallel to the substrate 218 (see FIG. 6). The plurality of holes 226 are formed in the flat region 228. The reflection sheet 220 further has first inclined regions 230 provided continuously with the flat region 228 in an inclined manner. The first inclined regions 230 are respectively provided continuously with a pair of sides extending in the first direction $D_1$ of the flat region 228. The reflection sheet 220 is folded so that boundaries are observable between the flat region 228 and the first inclined regions 230. In each of the first inclined regions 230, a surface on a side opposite to the substrate 218 (surface on which light is reflected) is curved so as to become a recess surface.

The reflection sheet 220 further has second inclined regions 232 provided continuously with the flat region 228 in an inclined manner. The second inclined regions 232 are respectively provided continuously with a pair of sides extending in the second direction $D_2$ of the flat region 228. The reflection sheet 220 is folded so that boundaries are observable between the flat region 228 and the second inclined regions 232. One second inclined region 232 is positioned between a pair of the first inclined regions 230, and one first inclined region 230 is positioned between a pair of the second inclined regions 232.

Third Embodiment

Figure 8:
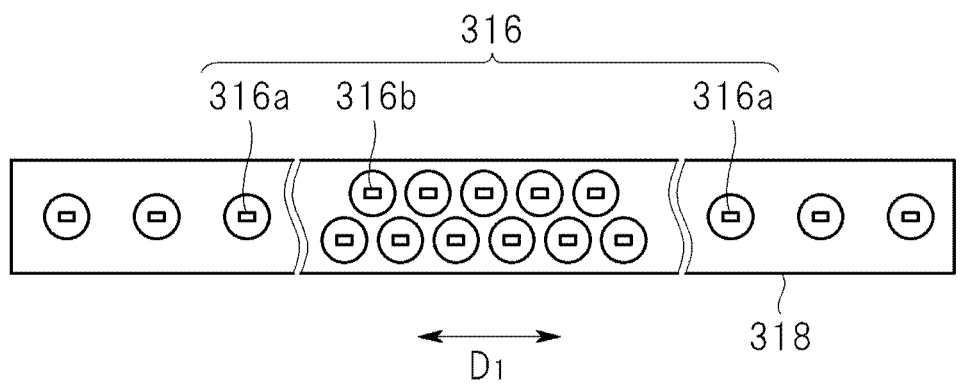
FIG. 8 is a view illustrating an arrangement of a plurality of light emitting diodes of a liquid crystal display device according to a third embodiment of the present invention.

FIG. 8 is a view illustrating an arrangement of a plurality of light emitting diodes of a liquid crystal display device according to a third embodiment of the present invention.

In this embodiment, a plurality of light emitting diodes 316 are separated into a first group and a second group. Light emitting diodes 316a in the first group are arranged in a row in the first direction $D_1$. The light emitting diodes 316a in the first group are disposed at both end portions of a substrate 318, which sandwich a central portion thereof. The light emitting diodes 316a in the first group are arranged at equal pitches in the first direction $D_1$.

Light emitting diodes 316b in the second group are arranged in a staggered pattern in the first direction $D_1$. The light emitting diodes 316b in the second group are disposed at the central portion in the first direction $D_1$ of the substrate 318. The light emitting diodes 316b in the second group are arranged at equal pitches in the arrangement direction of the staggered pattern.

Figure 9:
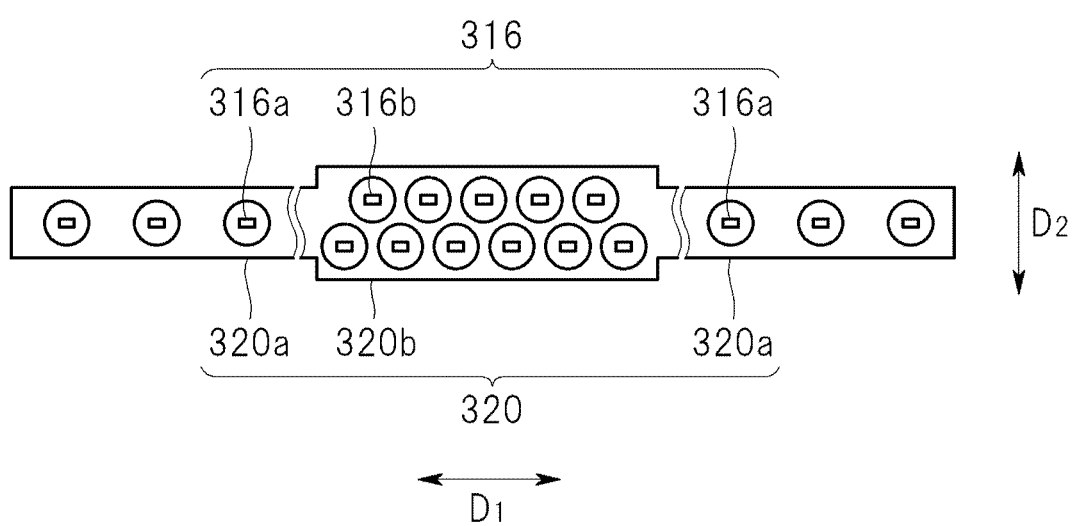
FIG. 9 is a view illustrating a first modified example of the third embodiment.

FIG. 9 is a view illustrating a first modified example of the third embodiment. In a substrate 320 of this example, a width of a central portion 320b in the second direction $D_2$ is larger than a width of each end portion 320a in the second direction $D_2$. This is the point different from the substrate 318 illustrated in FIG. 8.

Figure 10:
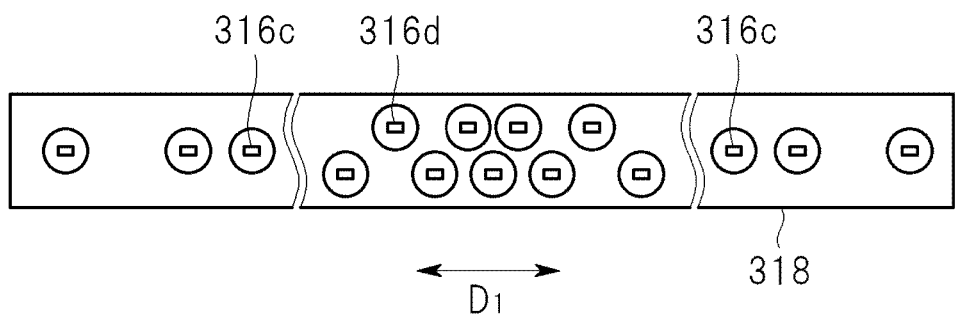
FIG. 10 is a view illustrating a second modified example of the third embodiment.

FIG. 10 is a view illustrating a second modified example of the third embodiment. In this example, pitches between adjacent light emitting diodes 316c in the first group are smaller as the adjacent light emitting diodes 316c are closer to a center of the substrate 318 in the first direction $D_1$. Further, pitches between adjacent light emitting diodes 316d in the second group in the arrangement direction of the staggered pattern are smaller as the adjacent light emitting diodes 316d are closer to the center of the substrate 318 in the first direction $D_1$.

Figure 11:
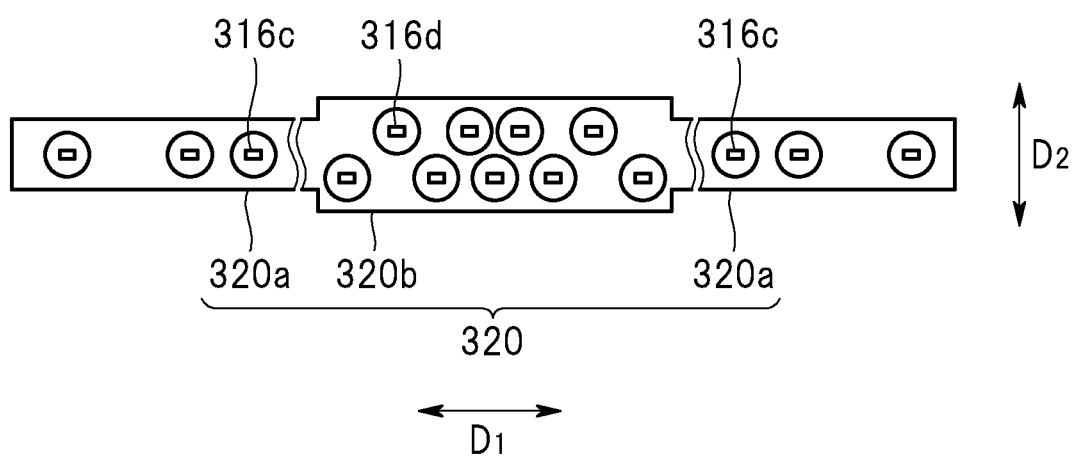
FIG. 11 is a view illustrating a third modified example of the third embodiment.

FIG. 11 is a view illustrating a third modified example of the third embodiment. In a substrate 320 of this example, a width of the central portion 320b in the second direction $D_2$ is larger than a width of each end portion 320a in the second direction $D_2$. This is the point different from the substrate 318 illustrated in FIG. 10.

Fourth Embodiment

Figure 12:
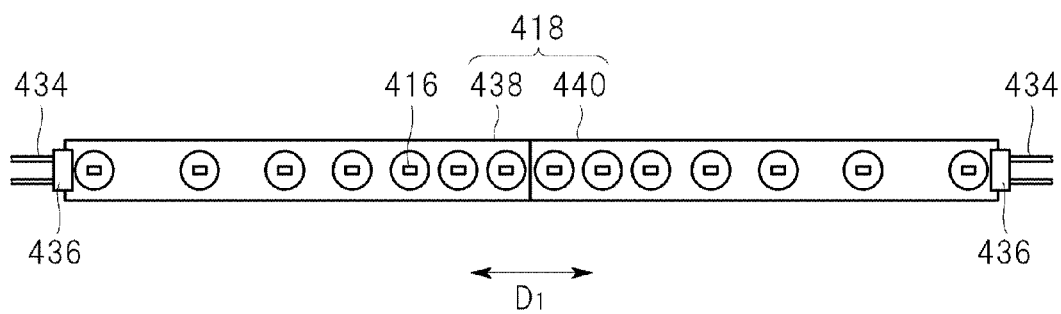
FIG. 12 is a view illustrating a substrate on which a plurality of light emitting diodes are mounted in a liquid crystal display device according to a fourth embodiment of the present invention.

FIG. 12 is a view illustrating a substrate on which a plurality of light emitting diodes are mounted in a liquid crystal display device according to a fourth embodiment of the present invention.

In this embodiment, pitches between adjacent light emitting diodes 416 are smaller as the adjacent light emitting diodes 416 are closer to a center of a substrate 418 in the first direction $D_1$. Further, the substrate 418 is divided into a first divided substrate 438 and a second divided substrate 440 between adjacent light emitting diodes 416 having the smallest pitch. The first divided substrate 438 and the second divided substrate 440 have the same design, and have a positional relationship of rotation symmetry to each other. The rotation center of the rotation symmetry in this case is positioned between the first divided substrate 438 and the second divided substrate 440.

At least one of the first divided substrate 438 and the second divided substrate 440 (both in the example of FIG. 12) includes, at one end portion thereof, a cable connector 436 for connection to a cable 434. Further, the first divided substrate 438 and the second divided substrate 440 are disposed so that the other end portion of the first divided substrate 438 and the other end portion of the second divided substrate 440 are adjacent to each other.

Figure 13:
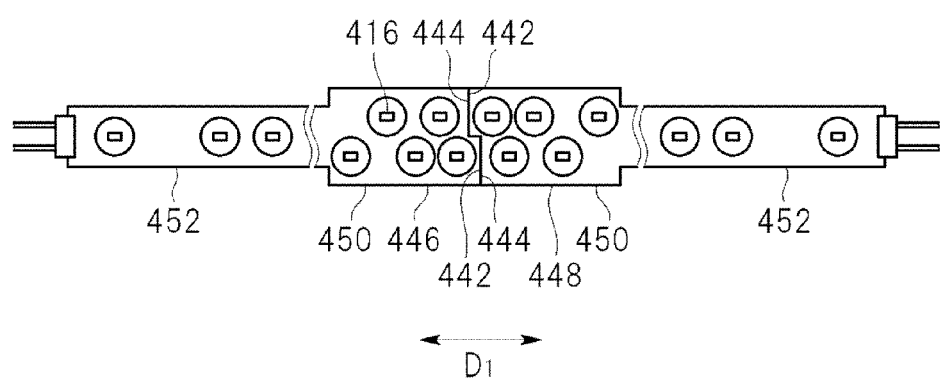
FIG. 13 is a view illustrating a first modified example of the substrate described in the fourth embodiment.

FIG. 13 is a view illustrating a first modified example of the substrate 418 described in the fourth embodiment. In this example, end portions of a first divided substrate 446 and a second divided substrate 448, the end portions being adjacent to each other, each have a recess portion 442 and a convex portion 444 at surfaces which are opposed to each other. The first divided substrate 446 and the second divided substrate 448 are disposed so that the recess portion 442 of one divided substrate is opposed to the convex portion 444 of the other divided substrate.

The plurality of light emitting diodes 416 are arranged in a staggered pattern in the first direction $D_1$ at least on the end portion side of the first divided substrate 446, at which the recess portion 442 and the convex portion 444 are formed, and on the end portion side of the second divided substrate 448, at which the recess portion 442 and the convex portion 444 are formed. Specifically, each of the first divided substrate 446 and the second divided substrate 448 includes a wide portion 450 and a narrow portion 452 in width in a short side direction, and in the wide portion 450, the plurality of light emitting diodes 416 are arranged in a staggered pattern. The convex portion 444 is protruded in the first direction $D_1$ from a light emitting diode 416 positioned outermost in the first direction $D_1$ of each of the first divided substrate 446 and the second divided substrate 448. The convex portion 444 and the recess portion 442 are formed adjacent to each other, and a side distinguishing the two portions extends so as to be parallel to the first direction $D_1$.

Figure 14:
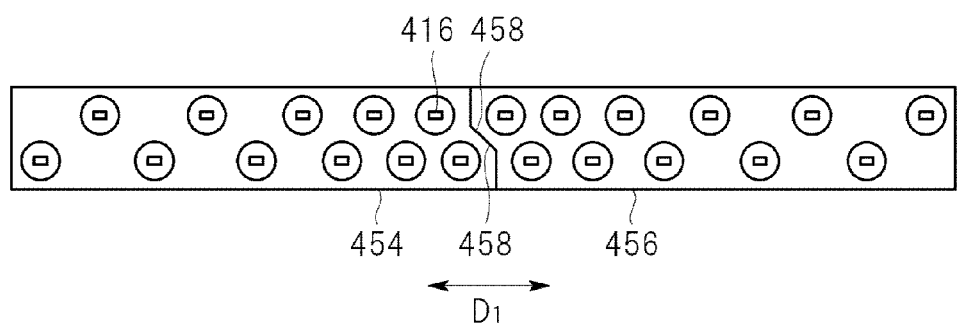
FIG. 14 is a view illustrating a second modified example of the substrate described in the fourth embodiment.

FIG. 14 is a view illustrating a second modified example of the substrate 418 described in the fourth embodiment. In this example, across an entire first divided substrate 454 and an entire second divided substrate 456, the plurality of light emitting diodes 416 are arranged in a staggered pattern in the first direction $D_1$. Therefore, each of the first divided substrate 454 and the second divided substrate 456 has a constant width in the short side direction, which is different from the example of FIG. 13. In FIG. 14, a side 458 distinguishing the convex portion and the recess portion extends obliquely so as to intersect the first direction $D_1$.

Fifth Embodiment

Figure 15:
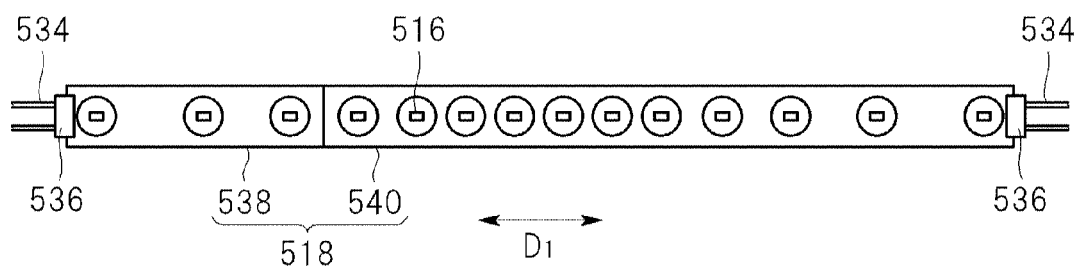
FIG. 15 is a view illustrating a substrate on which a plurality of light emitting diodes are mounted in a liquid crystal display device according to a fifth embodiment of the present invention.

FIG. 15 is a view illustrating a substrate on which a plurality of light emitting diodes are mounted in a liquid crystal display device according to a fifth embodiment of the present invention.

In this embodiment, pitches between adjacent light emitting diodes 516 are smaller as the adjacent light emitting diodes 516 are closer to a center of a substrate 518 in the first direction $D_1$. The substrate 518 is divided into a first divided substrate 538 and a second divided substrate 540 between adjacent light emitting diodes 516 provided at a position away from a position where adjacent light emitting diodes 516 having the smallest pitch are provided. At least one of the first divided substrate 538 and the second divided substrate 540 (both in the example of FIG. 15) includes, at one end portion thereof, a cable connector 536 for connection to a cable 534. The first divided substrate 538 and the second divided substrate 540 are disposed so that the other end portion of the first divided substrate 538 and the other end portion of the second divided substrate 540 are adjacent to each other.

Sixth Embodiment

Figure 16:
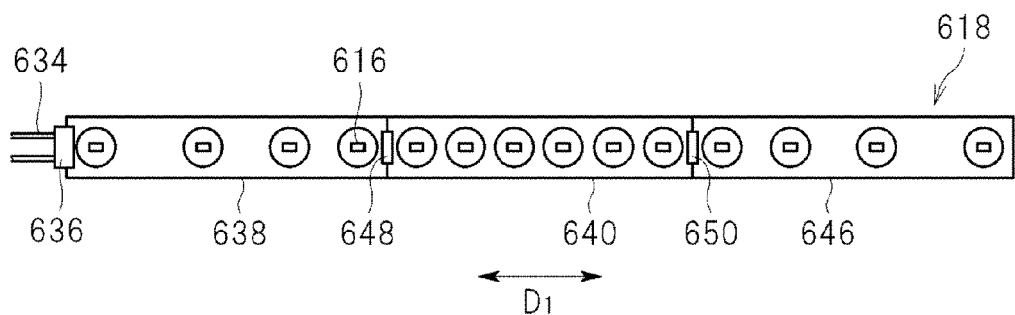
FIG. 16 is a view illustrating a substrate on which a plurality of light emitting diodes are mounted in a liquid crystal display device according to a sixth embodiment of the present invention.

FIG. 16 is a view illustrating a substrate on which a plurality of light emitting diodes are mounted in a liquid crystal display device according to a sixth embodiment of the present invention.

In this embodiment, pitches between adjacent light emitting diodes 616 are smaller as the adjacent light emitting diodes 616 are closer to a center of a substrate 618 in the first direction $D_1$. The substrate 618 is divided into a first divided substrate 638, a second divided substrate 640, and a third divided substrate 646 between adjacent light emitting diodes 616 provided at positions away from a position where adjacent light emitting diodes 616 having the smallest pitch are provided.

At one end portion of the first divided substrate 638, a cable connector 636 for connection to a cable 634 is provided. The other end portion of the first divided substrate 638 and one end portion of the second divided substrate 640 are electrically connected to each other by a first substrate connector 648. The other end portion of the second divided substrate 640 and one end portion of the third divided substrate 646 are electrically connected to each other by a second substrate connector 650.

Figure 17:
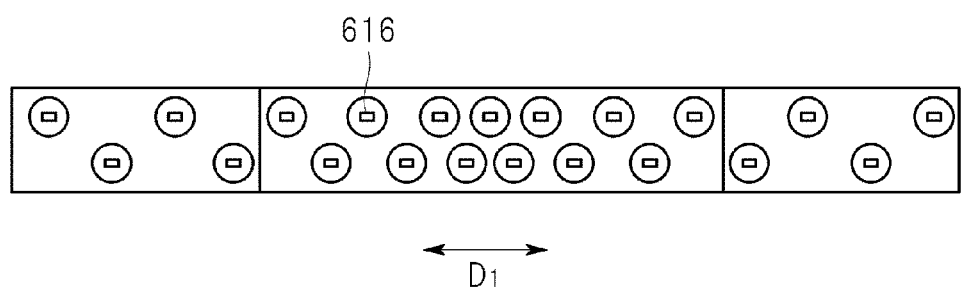
FIG. 17 is a view illustrating a first modified example of the substrate described in the sixth embodiment.

FIG. 17 is a view illustrating a first modified example of the substrate 618 described in the sixth embodiment. In this example, the plurality of light emitting diodes 616 are arranged in a staggered pattern in the first direction $D_1$. Pitches between adjacent light emitting diodes 616 correspond to pitches between adjacent light emitting diodes 616 in an arrangement direction of the staggered pattern.

Figure 18:
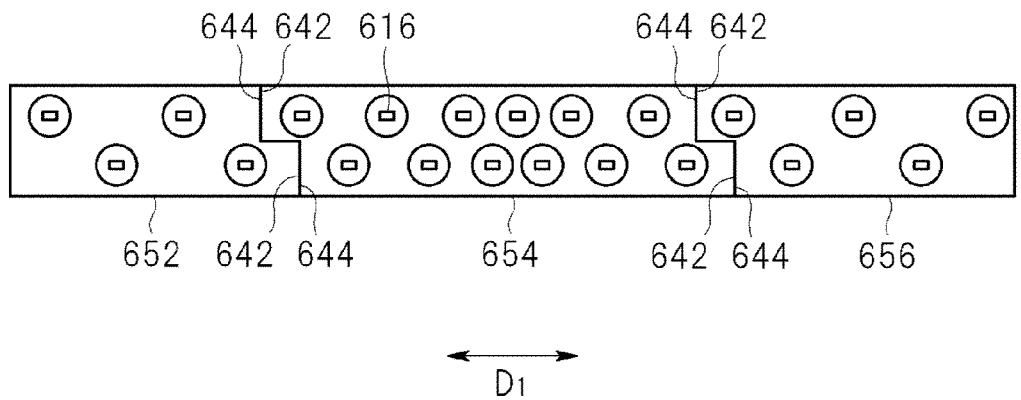
FIG. 18 is a view illustrating a second modified example of the substrate described in the sixth embodiment.

FIG. 18 is a view illustrating a second modified example of the substrate 618 described in the sixth embodiment. In this example, end portions of a first divided substrate 652 and a second divided substrate 654, the end portions being electrically connected to each other, each have a recess portion 642 and a convex portion 644 at surfaces which are opposed to each other. End portions of the second divided substrate 654 and a third divided substrate 656, the end portions electrically connected to each other, each have the recess portion 642 and the convex portion 644 at surfaces which are opposed to each other.

The convex portion 644 is protruded in the first direction $D_1$ from a light emitting diode 616 positioned outermost in the first direction $D_1$ of each of the first divided substrate 652, the second divided substrate 654, and the third divided substrate 656.

The first divided substrate 652 and the second divided substrate 654 are disposed so that the recess portion 642 of one divided substrate is opposed to the convex portion 644 of the other divided substrate. The second divided substrate 654 and the third divided substrate 656 are disposed so that the recess portion 642 of one divided substrate is opposed to the convex portion 644 of the other divided substrate.

Figure 19:
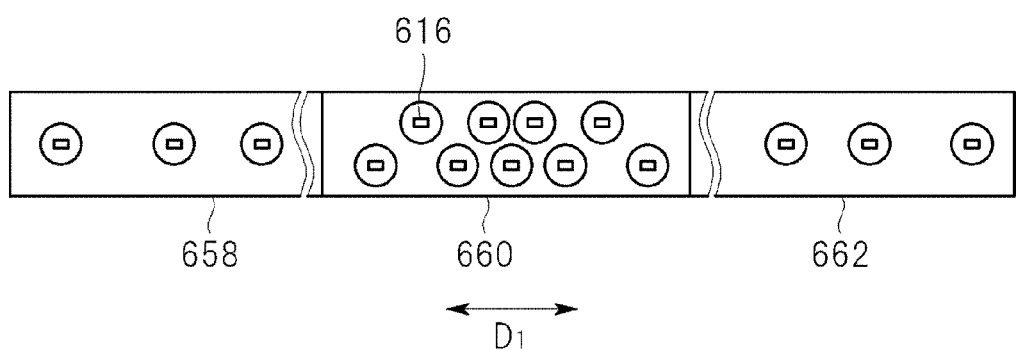
FIG. 19 is a view illustrating a third modified example of the substrate described in the sixth embodiment.

FIG. 19 is a view illustrating a third modified example of the substrate 618 described in the sixth embodiment. In this example, light emitting diodes 616 disposed on a second divided substrate 660 are arranged in a staggered pattern in the first direction $D_1$. Pitches between adjacent light emitting diodes 616 correspond to pitches between adjacent light emitting diodes 616 in an arrangement direction of the staggered pattern. Meanwhile, light emitting diodes 616 respectively disposed on a first divided substrate 658 and a third divided substrate 662 are arranged in a row in the first direction $D_1$.

Figure 20:
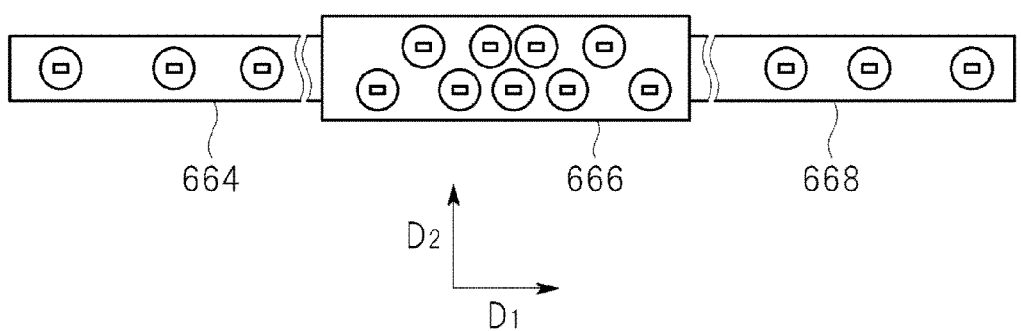
FIG. 20 is a view illustrating a fourth modified example of the substrate described in the sixth embodiment.

FIG. 20 is a view illustrating a fourth modified example of the substrate 618 described in the sixth embodiment. In this example, a width of a second divided substrate 666 in the second direction $D_2$ is larger than any of a width of a first divided substrate 664 in the second direction $D_2$ and a width of a third divided substrate 668 in the second direction $D_2$.

Seventh Embodiment

Figure 21:
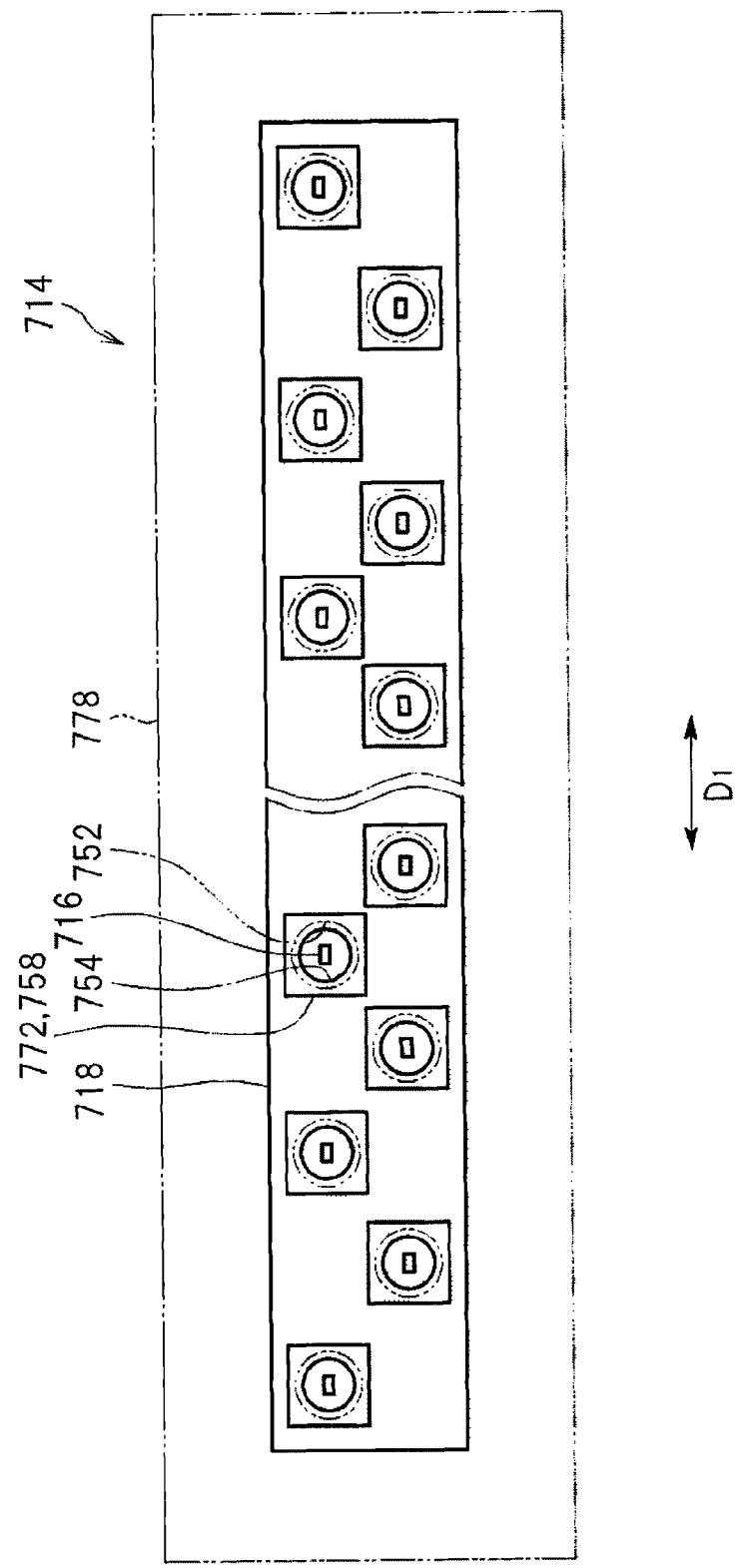
FIG. 21 is a view illustrating a backlight of a liquid crystal display device according to a seventh embodiment of the present invention.

FIG. 21 is a view illustrating a backlight of a liquid crystal display device according to a seventh embodiment of the present invention.

In this embodiment, light emitting diodes 716 are arranged in a staggered pattern in the first direction $D_1$. A backlight 714 includes a first reflection sheet 778, which overlaps a substrate 718. The first reflection sheet 778 has a plurality of first holes 752 formed therein, which allow the plurality of light emitting diodes 716 to be disposed on the inner side thereof.

The backlight 714 includes a second reflection sheet 772 adhered to the substrate 718. The second reflection sheet 772 is divided into a plurality of reflection pieces 758. The second reflection sheet 772 includes, as a whole, a plurality of second holes 754, which allow the plurality of light emitting diodes 716 to be respectively disposed on the inner side thereof. One reflection piece 758 includes one second hole 754, which allows one light emitting diode 716 to be disposed on the inner side thereof. On the inner side of each of the first holes 752, at least a part of an edge portion of the corresponding second hole 754 is exposed. That is, the first reflection sheet 778 overlaps the second reflection sheet 772 (plurality of reflection pieces 758) adhered to substrate 718.

Pitches between adjacent light emitting diodes 716 are smaller as the adjacent light emitting diodes 716 are closer to a center of the substrate 718 in the first direction $D_1$. Further, the plurality of reflection pieces 758 are each formed in a size and shape so that, at a position corresponding to the adjacent light emitting diodes 716 having the smallest pitch, adjacent reflection pieces 758 are provided without overlapping each other.

Figure 22:
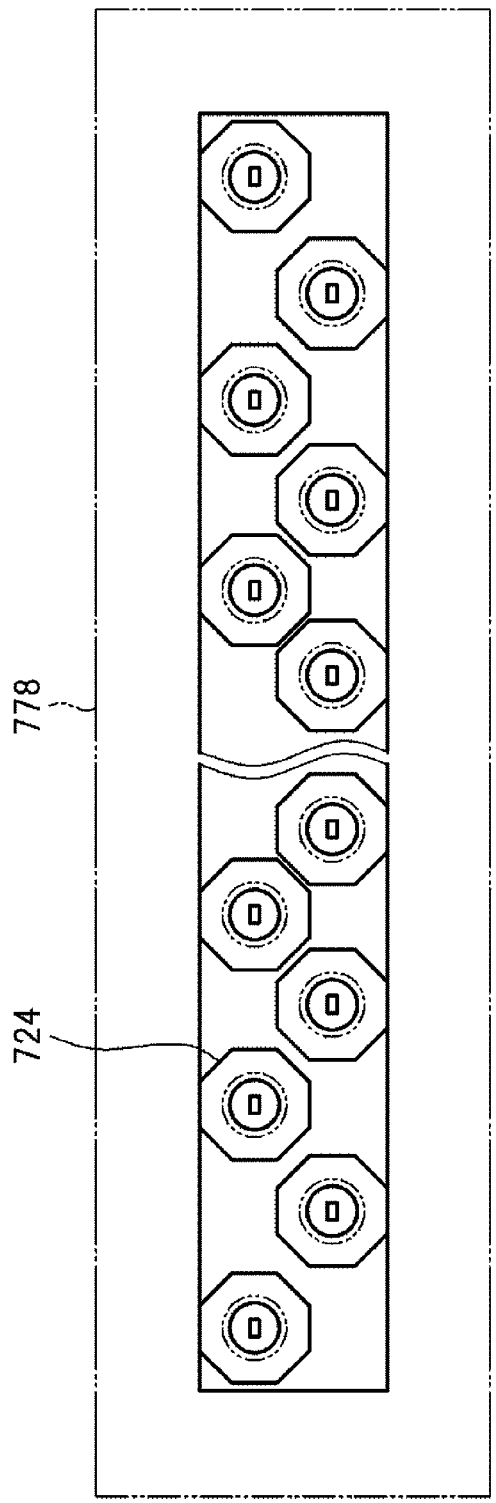
FIG. 22 is a view illustrating a modified example of reflection pieces.
Figure 23:
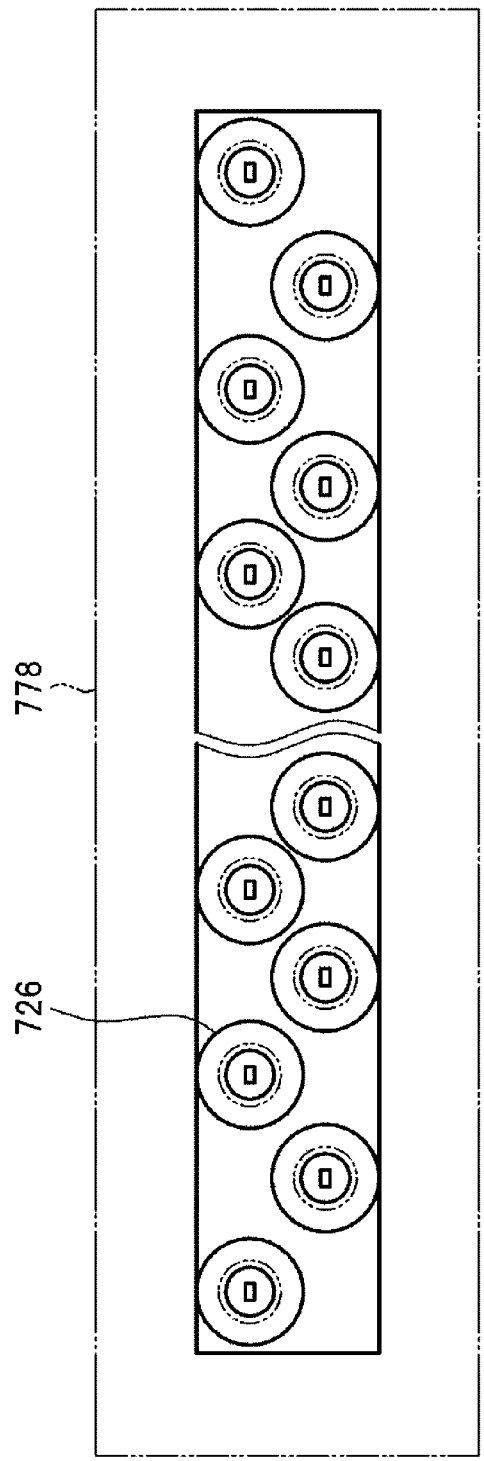
FIG. 23 is a view illustrating another modified example of reflection pieces.

The reflection pieces 758 illustrated in FIG. 21 each have a rectangular outer shape, but alternatively, there may be used reflection pieces 724 each having a hexagonal outer shape as illustrated in FIG. 22, or reflection pieces 726 each having a circular outer shape as illustrated in FIG. 23.

Figure 24:
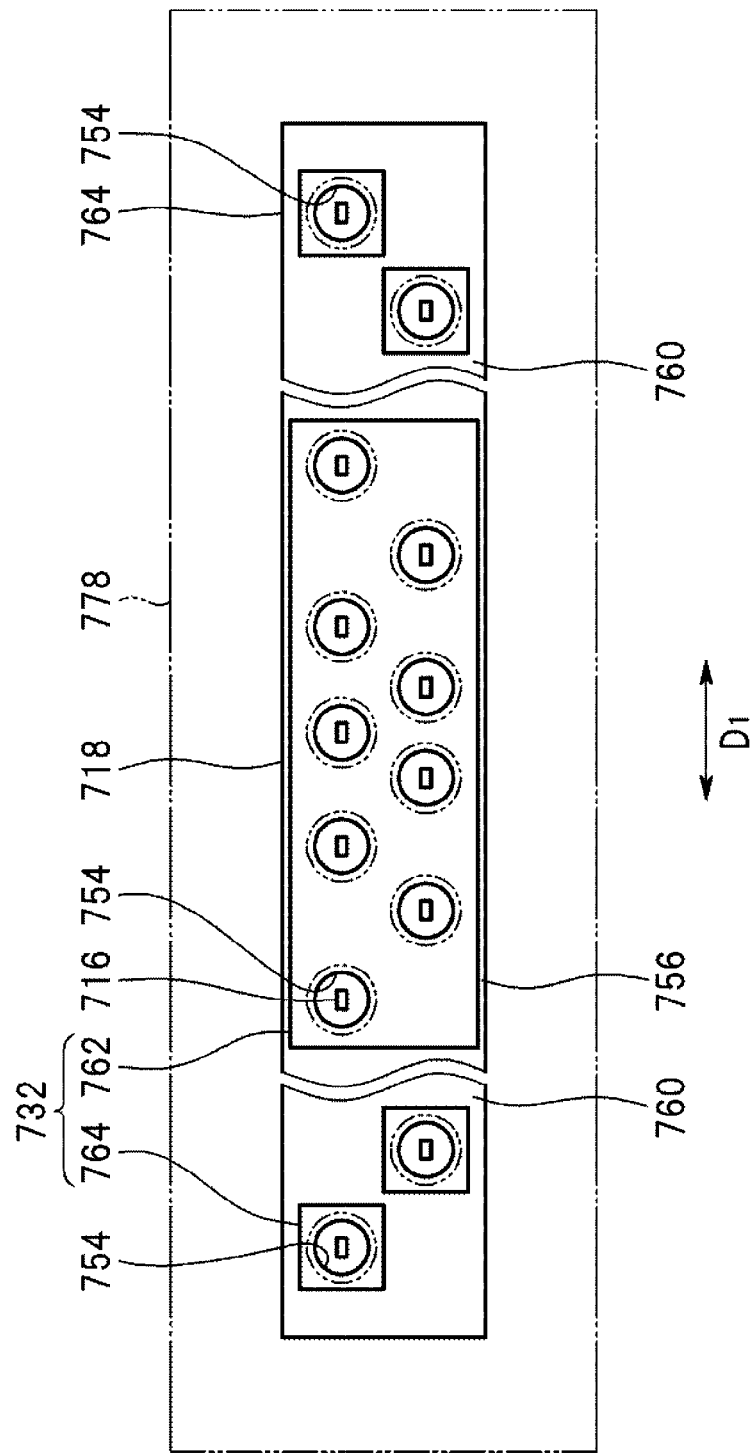
FIG. 24 is a view illustrating a first modified example of the backlight described in the seventh embodiment.

FIG. 24 is a view illustrating a first modified example of the backlight described in the seventh embodiment. In this example, pitches between adjacent light emitting diodes 716 are smaller as the adjacent light emitting diodes 716 are closer to the center of the substrate 718 in the first direction $D_1$. A second reflection sheet 732 is divided into a first reflection piece 762 and a plurality of second reflection pieces 764. The first reflection piece 762 is disposed in a first region 756 at the center of the substrate 718. The first reflection piece 762 includes at least two second holes 754. The plurality of second reflection pieces 764 are disposed at a pair of second regions 760 of the substrate 718, which sandwich the first region 756. Each of the second reflection pieces 764 includes one second hole 754.

Figure 25:
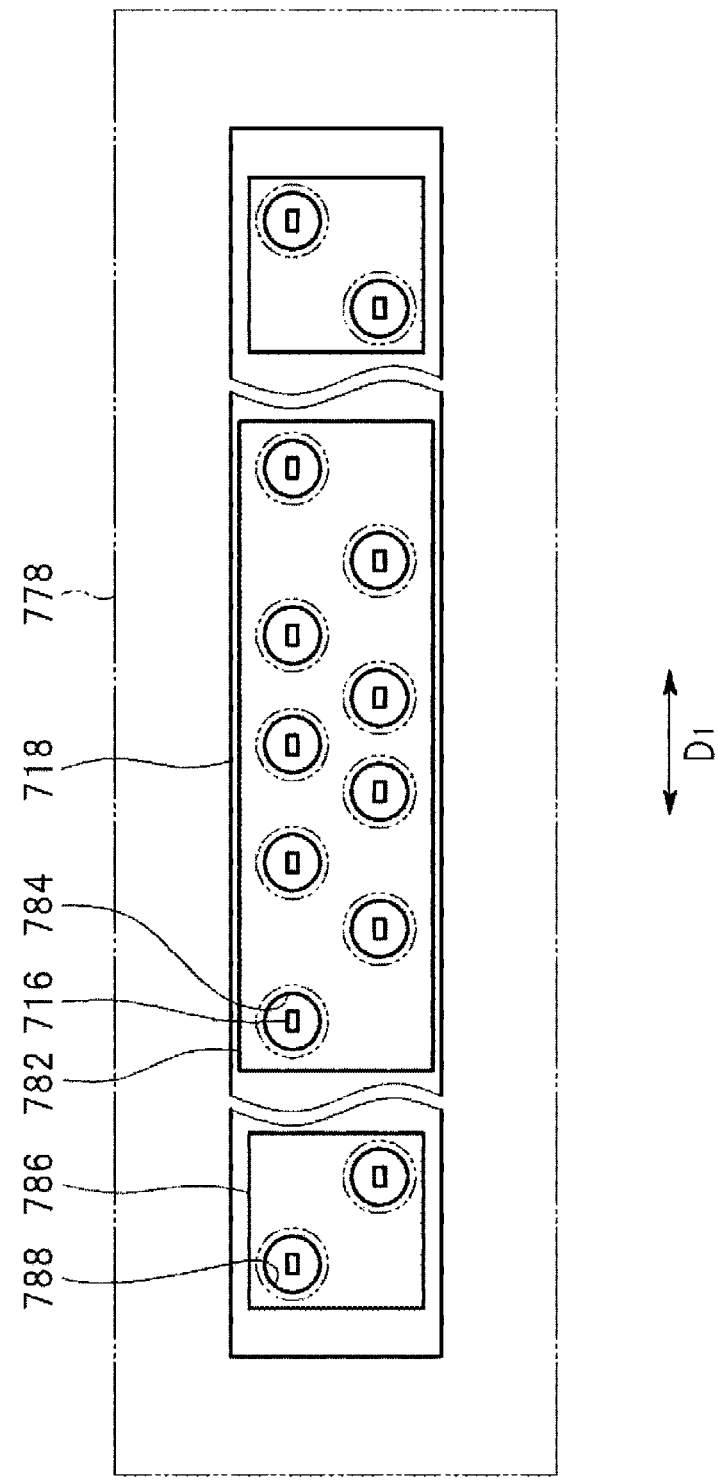
FIG. 25 is a view illustrating a second modified example of the backlight described in the seventh embodiment.

FIG. 25 is a view illustrating a second modified example of the backlight described in the seventh embodiment. In this example, a first reflection piece 782 includes at least two second holes 784. Each second reflection piece 786 includes at least two second holes 788. Other contents correspond to the contents of the first modified example described above.

Figure 26:
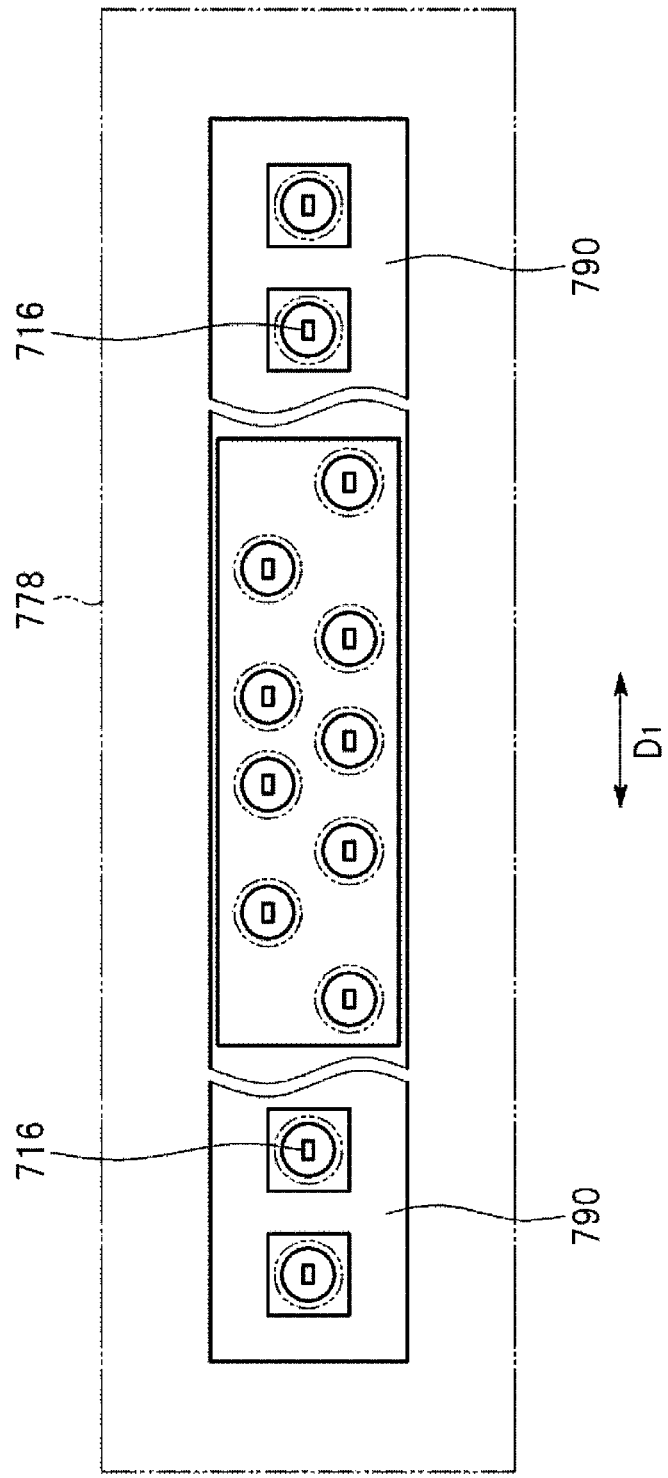
FIG. 26 is a view illustrating a third modified example of the backlight described in the seventh embodiment.

FIG. 26 is a view illustrating a third modified example of the backlight described in the seventh embodiment. In this example, the light emitting diodes 716 disposed in each second region 790 are arranged in a row in the first direction $D_1$.

Figure 27:
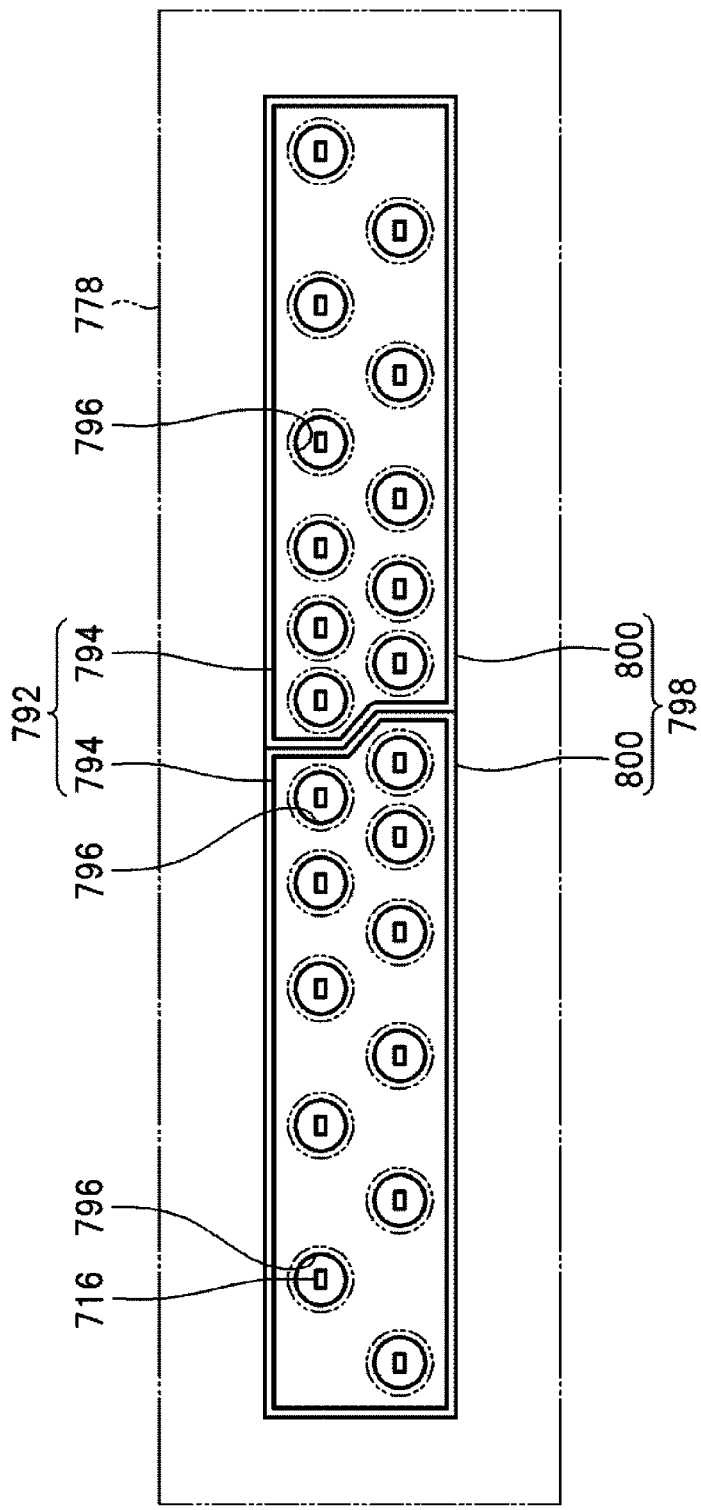
FIG. 27 is a view illustrating a fourth modified example of the backlight described in the seventh embodiment.

FIG. 27 is a view illustrating a fourth modified example of the backlight described in the seventh embodiment. In this example, a second reflection sheet 792 is divided into a plurality of reflection pieces 794. Each of the reflection pieces 794 includes at least two second holes 796, which allow at least two light emitting diodes 716 to be disposed on the inner side thereof one by one. A substrate 798 is divided into a plurality of divided substrates 800. Each of the reflection pieces 794 has an outer shape which is similar to that of the divided substrate 800 to which the corresponding reflection piece is adhered.

Eighth Embodiment

FIG. 28A is a view illustrating a backlight in a liquid crystal display device according to an eighth embodiment of the present invention.

In this embodiment, above a substrate 818 and above at least one light emitting diode 816, a lens 866 is disposed. The substrate 818 is supported by a support plate 822 on a side opposite to the plurality of light emitting diodes 816. The support plate 822 is larger in size than the substrate 818.

The lens 866 is attached to the support plate 822 on the outer side of the substrate 818. For example, the lens 866 is adhered to the support plate 822 by an adhesive 868. The adhesive 868 may be provided at three portions arranged every 120 degrees in a circumferential direction as illustrated in FIG. 28A, at two portions arranged every 180 degrees in the circumferential direction as illustrated in FIG. 28B, or at four portions arranged every 90 degrees in the circumferential direction as illustrated in FIG. 28C.

Figure 29:
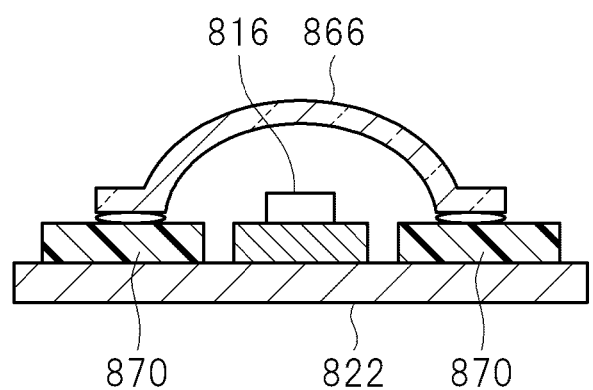
FIG. 29 is a view illustrating a first modified example of the backlight described in the eighth embodiment.

FIG. 29 is a view illustrating a first modified example of the backlight described in the eighth embodiment. In this example, a spacer 870 is provided on the support plate 822, and the lens 866 is supported by the support plate 822 through intermediation of the spacer 870.

FIG. 30A is a view illustrating a second modified example of the backlight described in the eighth embodiment. In this example, a plurality of substrates 818 are supported by the support plate 822, which is larger in size than the substrate 818, on the side opposite to the plurality of light emitting diodes 816. Above each of the substrates 818 and above at least one light emitting diode 816, the lens 866 is disposed. The lens 866 is attached to the support plate 822 on the outer side of the substrate 818 disposed below the lens 866.

The lens 866 is attached to the support plate 822 on the outer side of the substrate 818. For example, the lens 866 is adhered to the support plate 822 by the adhesive 868. The adhesive 868 may be provided at three portions arranged every 120 degrees in the circumferential direction as illustrated in FIG. 30A, at two portions arranged every 180 degrees in the circumferential direction as illustrated in FIG. 30B, or at four portions arranged every 90 degrees in the circumferential direction as illustrated in FIG. 30C.

Figure 31:
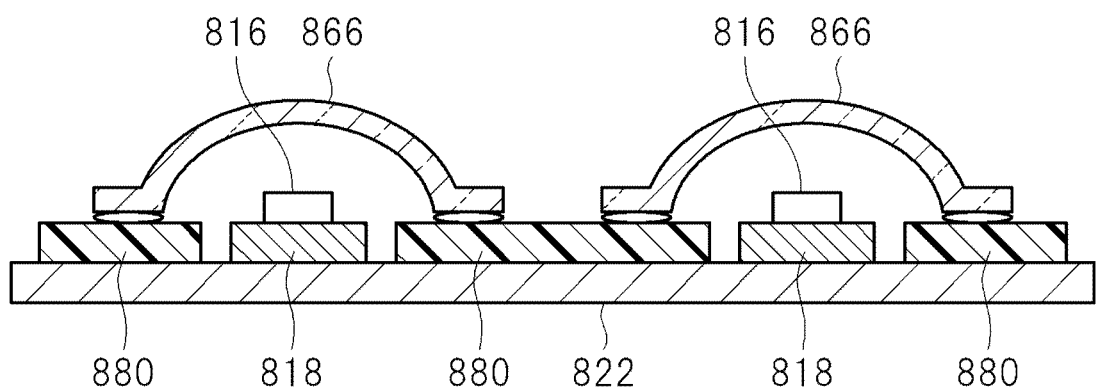
FIG. 31 is a view illustrating a third modified example of the backlight described in the eighth embodiment.

FIG. 31 is a view illustrating a third modified example of the backlight described in the eighth embodiment. In this example, a spacer 880 is provided on the support plate 822. The lens 866 is supported by the support plate 822 through intermediation of the spacer 880. The spacer 880 is disposed at least without being divided between the adjacent substrates 818. Both of the lenses 866, which are positioned above one substrate 818 and the other substrate 818, respectively, are supported by the spacer 880 disposed between the adjacent substrates 818.

Figure 32:
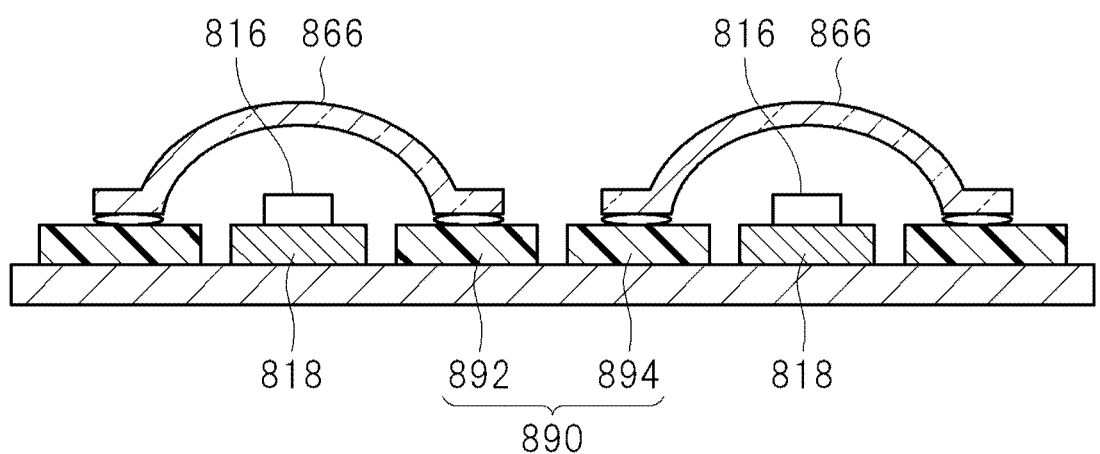
FIG. 32 is a view illustrating a fourth modified example of the backlight described in the eighth embodiment.

FIG. 32 is a view illustrating a fourth modified example of the backlight described in the eighth embodiment. In this example, a spacer 890 is divided into a first divided spacer 892 and a second divided spacer 894. Between the adjacent substrates 818, the first divided spacer 892 is disposed near one substrate 818, and the second divided spacer 894 is disposed near the other substrate 818. The lens 866 positioned above the one substrate 818 is supported by the first divided spacer 892. The lens 866 positioned above the other substrate 818 is supported by the second divided spacer 894.

By incorporating the liquid crystal display device described in any one of the embodiments described above, a television set can be formed, which receives radio waves for television broadcast to display images and output sound. Hereinafter, a liquid crystal television set is described as an example.

Ninth Embodiment

Figure 33:
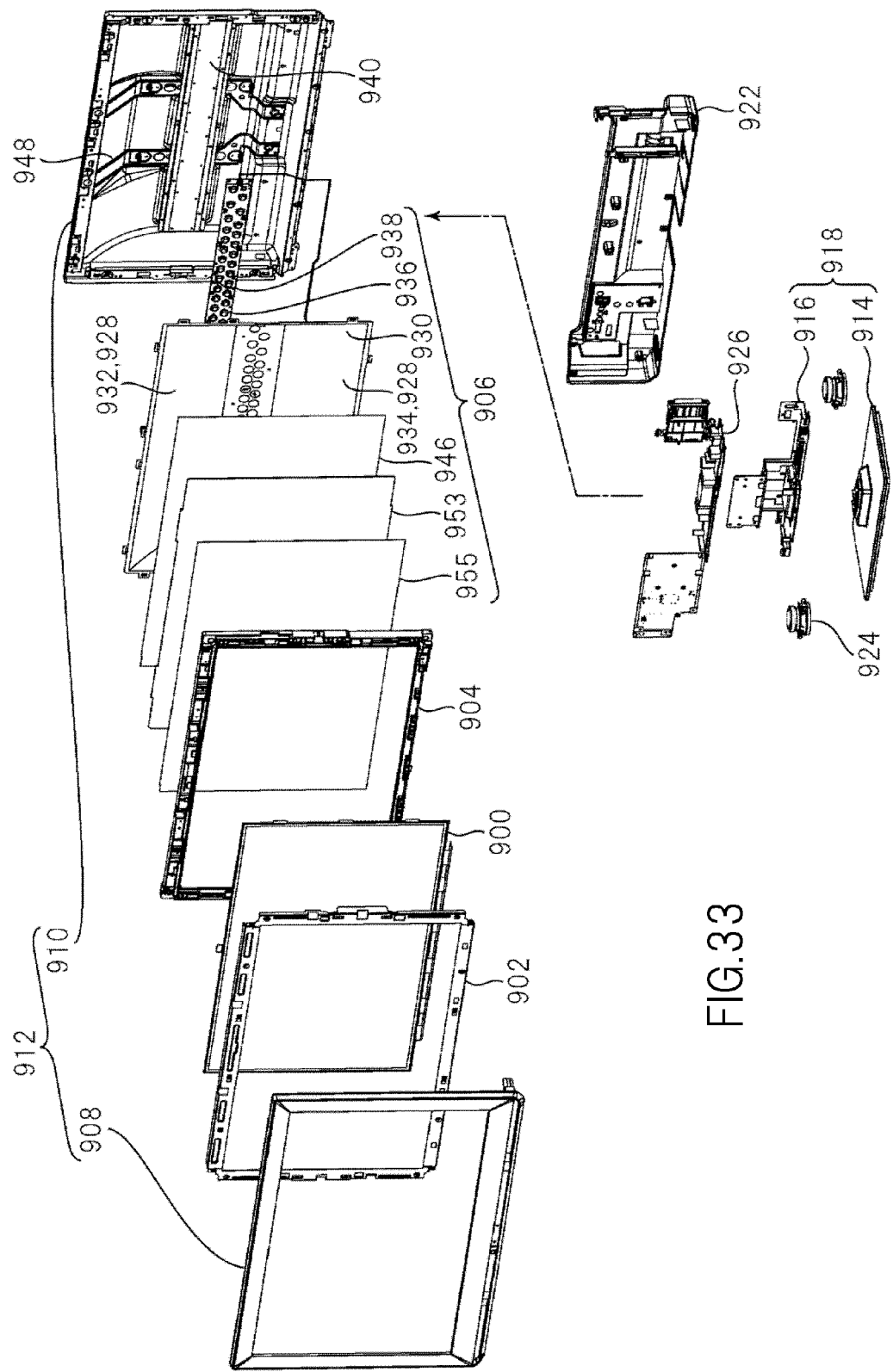
FIG. 33 is an exploded perspective view of a liquid crystal television set according to a ninth embodiment of the present invention.
Figure 34:
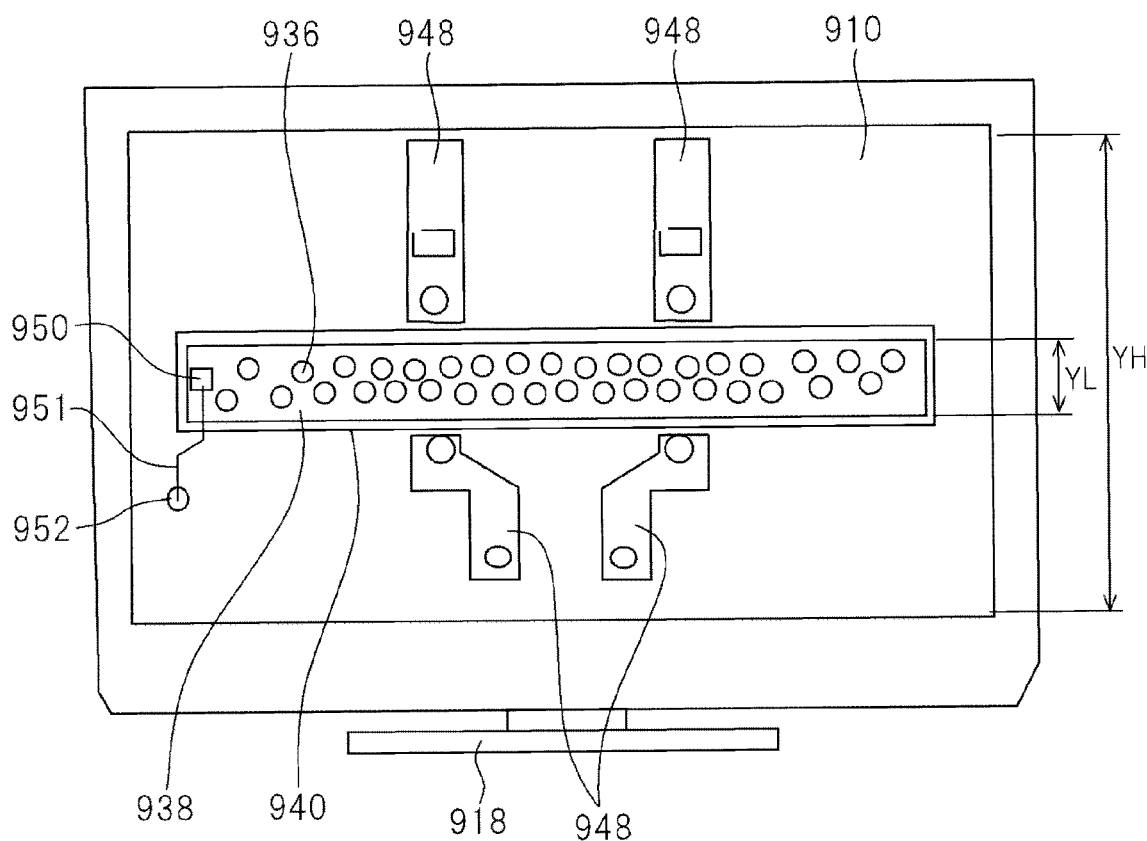
FIG. 34 is a view illustrating members provided behind a reflection sheet of the liquid crystal television set illustrated in FIG. 33.
Figure 35:
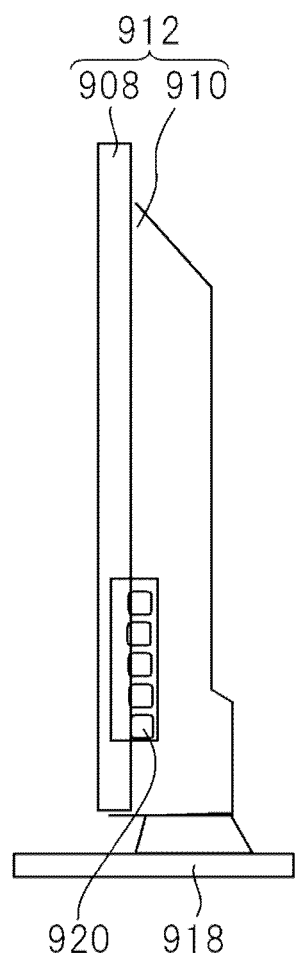
FIG. 35 is a side view of the liquid crystal television set illustrated in FIG. 33.
Figure 36:
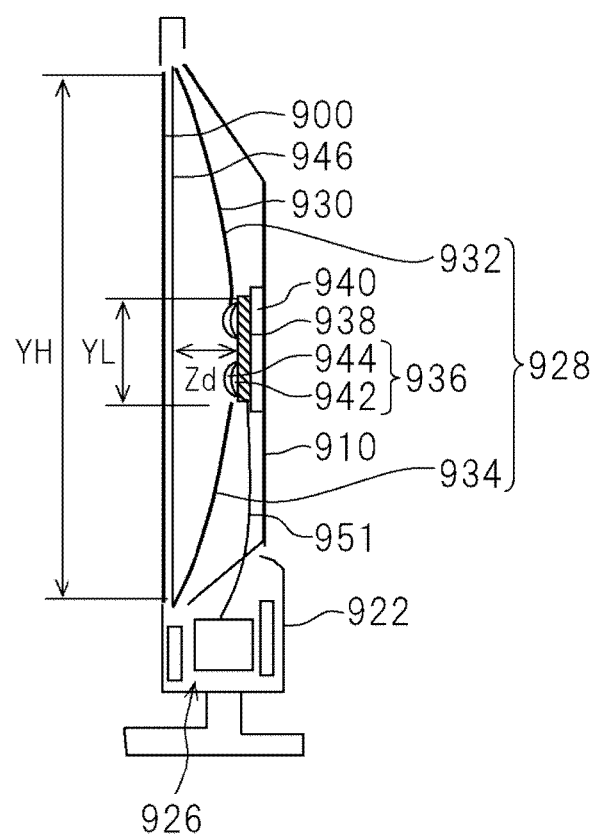
FIG. 36 is a schematic view of a vertical cross section of the liquid crystal television set illustrated in FIG. 33.

FIG. 33 is an exploded perspective view of a liquid crystal television set according to a ninth embodiment of the present invention. FIG. 34 is a view illustrating members provided behind a reflection sheet of the liquid crystal television set illustrated in FIG. 33. FIG. 35 is a side view of the liquid crystal television set illustrated in FIG. 33. FIG. 36 is a schematic view of a vertical cross section of the liquid crystal television set illustrated in FIG. 33.

The liquid crystal television set includes a liquid crystal display panel 900 having a horizontally long screen. The screen of the liquid crystal television set has an aspect ratio (ratio of horizontal dimension to vertical dimension) of 16:9. The liquid crystal display panel 900 has a front side (side on which an image is displayed) supported by an upper frame 902, and a rear side supported by a mold frame 904. The liquid crystal television set includes a backlight 906, which is overlapped by the liquid crystal display panel 900.

The liquid crystal display panel 900, the upper frame 902, the mold frame 904, and the backlight 906 are stored in a cabinet 912 including a front cabinet 908 and a back cabinet 910. The front cabinet 908 is made of a resin, and the back cabinet 910 is made of a metal subjected to coating or a resin. The cabinet 912 is supported by a stand 918 including a pedestal 914 and a leg 916. As illustrated in FIG. 35, on the side surface of the cabinet 912, switches 920 for selecting a channel to be displayed and controlling the volume are provided.

A cover 922 is attached to a lower rear part of the back cabinet 910. A speaker 924 and a circuit board 926 are disposed inside the cover 922. The circuit board 926 includes a tuned circuit (tuner) for selecting a radio wave having a specific frequency from radio waves having various frequencies.

The backlight 906 includes a reflection sheet 930 having a curved portion 928 so that a recess surface thereof faces the liquid crystal display panel 900. The curved portion 928 of the reflection sheet 930 is disposed so as to be separated from the cabinet 912 (see FIG. 36). The curved portion 928 includes a first curved portion 932 and a second curved portion 934. The first curved portion 932 and the second curved portion 934 are formed on respective sides of the reflection sheet 930 in a vertical direction of the screen while sandwiching a plurality of point light sources 936. The circuit board 926 is disposed on a lower side of a space between the curved portion 928 and the back cabinet 910 (see FIG. 36).

The backlight 906 includes a substrate 938 on which the reflection sheet 930 is overlapped on a side opposite to the liquid crystal display panel 900 of the reflection sheet 930. A width of the substrate 938 in the vertical direction of the screen is half the length of the screen in the vertical direction or less. The substrate 938 is fixed to the cabinet 912. The substrate 938 may be directly fixed to the cabinet 912, or may be fixed to the cabinet 912 through intermediation of a radiator plate 940. FIG. 33 exemplifies the latter case, that is, the substrate 938 is fixed to the radiator plate 940, and the radiator plate 940 is fixed to the cabinet 912. Note that, the substrate 938 and the radiator plate 940 correspond to the substrate 18 and the support plate 22 of FIG. 1, respectively.

In this embodiment, at a position roughly corresponding to a center of the screen, the point light sources 936 including light emitting diodes 942 (see FIG. 36) are mounted on the rectangular substrate 938, which is long in the horizontal direction. A printed-wiring board may be used as the substrate 938. Fixation of the substrate 938 is performed by threadably mounting the substrate 938 on the back cabinet 910, or threadably mounting the substrate 938 on the radiator plate 940 made of a metal such as aluminum and then fixing the radiator plate 940 to the back cabinet 910. The light emitting diodes 942 are arranged in a staggered pattern and in two rows in the up-and-down direction, so as to extend in the horizontal direction. When seen from the front side, a dimension YL of the substrate 938 is set so as to be one-third a height YH of the screen of the liquid crystal display panel 900 or less.

The backlight 906 includes the plurality of point light sources 936, which are mounted on the substrate 938 and disposed so as to protrude to the recess surface side of the curved portion 928 while passing through the reflection sheet 930. The plurality of point light sources 936 are arranged in at least one row in the horizontal direction of the screen, and arranged so as to be stored within a space region, which has a width in the vertical direction of the screen, the width being half the length of the screen in the vertical direction or less. Each of the point light sources 936 includes, as illustrated in FIG. 36, the light emitting diode 942 and a lens 944 disposed on the outer side thereof. On the substrate 938, the lenses 944 each made using an acrylic resin are mounted so as to respectively cover the light emitting diodes 942.

Figure 37:
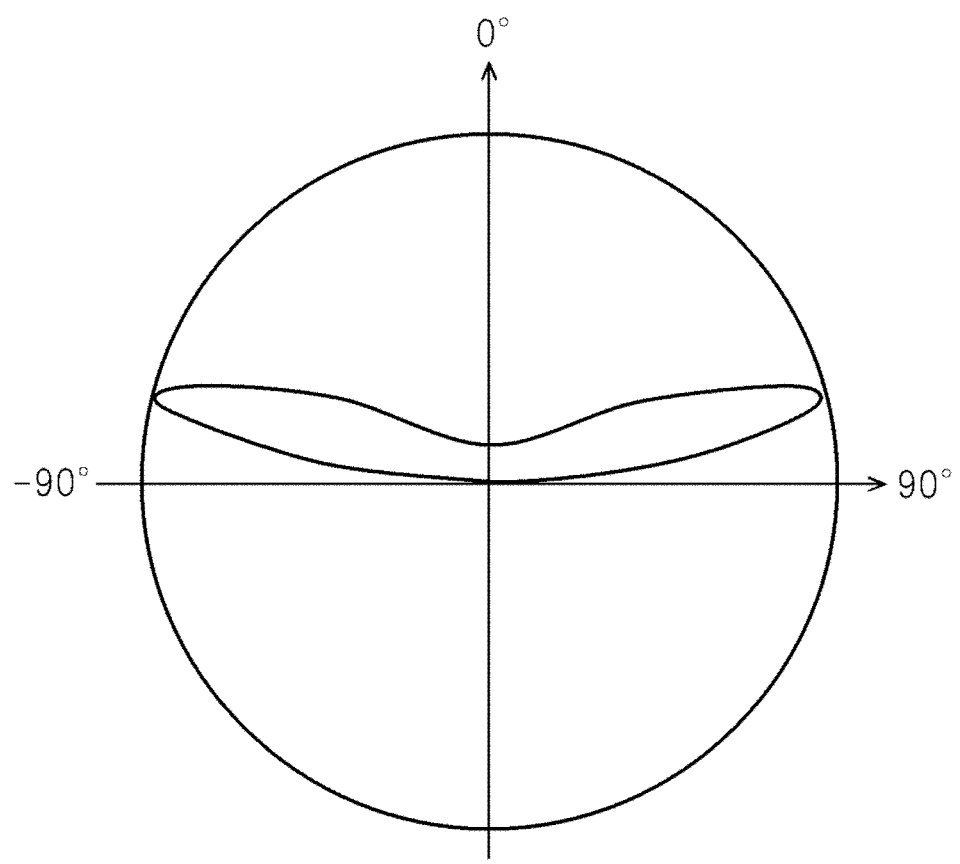
FIG. 37 is a graph illustrating a light intensity distribution (directivity characteristic) of a point light source.
Figure 38:
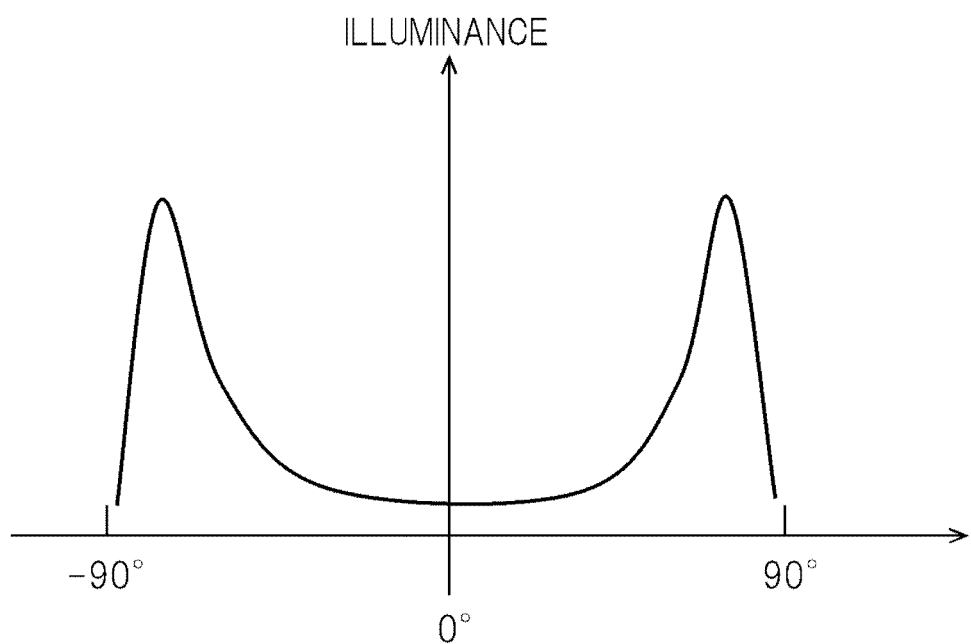
FIG. 38 is a graph illustrating a measurement result of intensity of light.

The point light source 936 emits light in a perpendicular direction to the substrate 938 and in other directions, and light emitted in the other directions is higher in intensity than light emitted in the perpendicular direction. The lens 944 has a wide light distribution characteristic, which causes the light emitted from the light emitting diode 942 to be more spread out in a viewing angle direction than in a front side direction. Such a light intensity distribution (directivity characteristic) of the point light source 936 is illustrated in FIG. 37. Further, FIG. 38 is a graph illustrating a measurement result of intensity of light which exits from the lens 944. Note that, angle values represent a light emission direction from the point light source 936. 0° corresponds to the surface side opposed to the liquid crystal display panel 900 (vertical direction to a plane of the substrate 938), and ±90° correspond to directions parallel to the plane of the substrate 938.

One of the features of the liquid crystal television set is high image quality performance, which provides an impression that, although the vertical direction dimension YL of the substrate 938 is reduced to be one-third the screen dimension YH or less along the vertical direction of the screen, the screen is bright and high brightness uniformity is provided across the entire screen.

In the conventional liquid crystal television set, a plurality of substrates each including a plurality of light emitting diodes are provided so as to obtain uniform brightness or smooth brightness change even in a region between the substrates. Specifically, many light emitting diodes are used to shorten intervals between the light emitting diodes and hence obtain smooth brightness change, and the substrates are disposed so that each position of the individual light emitting diodes cannot be optically recognized. Further, there is a case where wide intervals are provided between the plurality of substrates by disposing lenses for wide light distribution above the light emitting diodes, but even in this case, the dimension of the substrates is larger than half the screen.

In this embodiment, a dimension between outer surfaces of a pair of lenses 944 which are most separated in the vertical direction, the outer surfaces facing directions opposite to each other, is one-third the screen dimension YH or less. When the light emitting diodes 942 are arranged in a row in the horizontal direction, a width (diameter) of the lens 944 in the vertical direction is one-third the screen dimension YH or less. In order to reduce cost, the light emitting diode 942 and the lens 944 are formed in dimensions not to extend off the substrate 938, and the dimensions thereof are set to the minimum.

In this embodiment, the vertical dimension YL of the substrate 938, or the dimension between outer sides of the lenses 944 arranged in two rows in the vertical direction, is one-third the vertical dimension of the screen or less. Therefore, even if the number of the light emitting diodes 942 is reduced, the screen is bright and a natural and smooth brightness distribution is obtained. Therefore, the cost may be greatly reduced.

In this embodiment, the curved portion 928 of the reflection sheet 930 is formed so as to have a width of a length obtained by subtracting the vertical dimension YL of the substrate 938 from the dimension YH in the vertical direction of the screen (short side direction of the screen). When the width of the curved portion 928 is half the dimension YH or more, the brightness distribution of the screen is comfortable even when the screen is seen from the front side. Further, the number of light emitting diodes 942 may be significantly reduced, and hence the cost may be reduced. That is, the cost may be reduced by forming a region for reflection by the curved portion 928 to be larger than a region for a space where the point light sources 936 are stored.

The light emitted from the light emitting diode 942 disposed on the substrate 938 is spread out by the lens 944, which is made of an acrylic resin and disposed above the light emitting diode 942. The light thus spread out has a distribution characteristic that light intensity is larger in an oblique direction than in the front side direction. The lens 944 for wide light distribution is attached to each of the plurality of light emitting diodes 942, and hence, in a space in a range from the substrate 938 to a diffusion plate 946 provided in the perpendicular direction (direction to the screen) (hereinafter, referred to as inner thickness Zd), the light radiated to a peripheral direction of the screen from the substrate 938 has higher light intensity than that of the light emitted to the front side. Part of the light which exits from the lens 944 to the front side passes through the diffusion plate 946, and then is used to display an image by the liquid crystal display panel 900. Further, part of the light is reflected by the diffusion plate 946, and then reflected by the reflection sheet 930, to thereby be radiated to a direction different from the front side direction. Further, other part of light may directly enter the reflection sheet 930 from the lens 944, to thereby be radiated to various directions. The light which exits from the lens 944 is repeatedly reflected in the space between the reflection sheet 930 having the curved portion 928 and the diffusion plate 946, and thus light is caused to pass through almost the entire region of the screen with the use of the diffusion plate 946.

As for the brightness performance of the liquid crystal television set having the above-mentioned structure, when the maximum brightness measured from the front side is 100%, the periphery thereof is in a dark state of about 30%. A ratio of the brightness at the center of the screen in the front side to the average brightness is 1.65. However, because the curved portion 928 of the reflection sheet 930 is smoothly curved, smooth brightness change is obtained from the substrate 938 in the vertical direction of the screen. Therefore, even though the ratio of the central brightness to the average brightness is as large as 1.65, it is possible to provide a comfortable image because a large inflection point is absent in the distribution thereof.

The fact that a comfortable and smooth brightness distribution can be obtained even though the ratio of the central brightness to the average brightness is 1.65 or larger represents that, conversely, it is possible to reduce the number of the light emitting diodes 942 and narrow the width of the substrate 938, to thereby reduce the cost.

Note that, it is impossible to achieve the characteristic that the brightness at the center is high and the brightness decreases with smooth brightness distribution toward the periphery of the screen when a structure which blocks light radiation to the front side is provided. In this case, the center is dark, which results in uncomfortable display distribution.

Therefore, the light emission characteristic of each point light source 936, which includes the light emitting diode 942 and the lens 944 near the corresponding light emitting diode 942, includes a predetermined output to the front side.

The back cabinet 910 forms the outermost surface of the liquid crystal television set. The substrate 938 is threadably mounted on the radiator plate 940. By dissipating the heat from the light emitting diodes 942 by the substrate 938 and the radiator plate 940, the junction temperature of the light emitting diode 942 is suppressed to a predetermined value. In a case where the specification brightness of the liquid crystal television set is low, the radiator plate 940 may be omitted. In this case, the substrate 938 is directly fixed to the back cabinet 910. In this case, heat dissipation of the light emitting diode 942 is performed only by the substrate 938, but even with the heat dissipation effect of the substrate 938, the junction temperature of the light emitting diode 942 may be suppressed to a predetermined value.

The substrate 938 and the reflection sheet 930 are fixed at positions near the back cabinet 910, and hence it is possible to achieve a thin liquid crystal television set. With this structure, the thickness of the liquid crystal television set may be reduced while maintaining the comfortable uniformity of the brightness performance.

In the conventional backlight structure, the substrate on which the light emitting diodes are mounted is fixed to a back frame (not shown) of the liquid crystal display device, which is made of iron or aluminum. On the outer portion of the back frame, there are disposed a power supply for driving the light emitting diodes and a substrate of a timing controller for controlling a gate signal line and a drain signal line of the liquid crystal display panel. The back cabinet of the television set is disposed on a further outer portion thereof. Therefore, the television set requires, in addition to the inner thickness distance between the diffusion plate and the light emitting diode of the backlight, a distance provided between the back frame and the back cabinet, which causes the liquid crystal television set to be thick.

In this embodiment, light, which exits from the lens 944 with a higher brightness in the periphery than in the front side, passes through the predetermined space (inner thickness Zd), and then passes through the diffusion plate 946 and the liquid crystal display panel 900. With this, an image is displayed. The substrate 938 is brought into contact with the radiator plate 940, and the radiator plate 940 and the back cabinet 910 are fixed to each other by a screw, and hence a space distance other than the inner thickness Zd is unnecessary. Therefore, the thickness of the liquid crystal television set may be reduced.

The reduction in thickness of the liquid crystal television set is achieved also by the disposition of the circuit board 926 including a power supply circuit, a video circuit, a tuned circuit (tuner), and a timing circuit for the liquid crystal display panel 900. Specifically, the curved portion 928 of the reflection sheet 930 is curved in a direction separating from the back cabinet 910, and hence a large space can be obtained between the curved portion 928 and the back cabinet 910. In the lower portion of the liquid crystal television set, the circuit board 926 including the power supply circuit, the video circuit, the tuned circuit (tuner), and the timing circuit for the liquid crystal display panel 900 is stored in a compact manner. With this, a space is unnecessary between the back cabinet 910 and the substrate 938 on which the light emitting diodes 942 are mounted or the radiator plate 940. With this structure, even though the curved reflection sheet 930 is used, it is possible to achieve a thin television set.

Next, manufacturing steps of the liquid crystal television set are described with reference to FIGS. 33 to 36. For example, a wall-mount bracket 948 is attached to the back cabinet 910 from the inner side thereof, the back cabinet 910 being formed by subjecting a member made of an iron material to coating. The wall-mount bracket 948 reinforces the strength of the back cabinet 910. Screw receiving holes are formed in the wall-mount bracket 948, which are used when the liquid crystal television set is mounted on the wall from the rear side of the back cabinet 910. The radiator plate 940 is fixed to the inner side of the back cabinet 910, the radiator plate being made of, for example, an aluminum material.

Next, the substrate 938 on which the light emitting diodes 942 are mounted is attached to the radiator plate 940. On each of the light emitting diodes 942, the acrylic lens 944 for wide light distribution is capped, and the lens 944 is fixed by an adhesive. Depending on the brightness specification of the liquid crystal television set, when there is a margin in the junction temperature of the light emitting diode 942, the substrate 938 may be directly attached to the back cabinet 910. Here, on the surface of the substrate 938, a reflection sheet, such as the second reflection sheet 772 of the seventh embodiment, is adhered to the periphery of the light emitting diodes 942. Instead of a sheet such as the second reflection sheet 772, a white resist may be applied onto the substrate 938 so that light emitted from the light emitting diodes 942 can easily perform successive reflection.

A connector 950 illustrated in FIG. 34 is an electrical connection portion of wiring lines extending to the point light sources 936 on the substrate 938. A wiring line 951 is connected to the connector 950, and is pulled out to the rear surface of the back cabinet 910 via an extraction hole 952 formed in the back cabinet 910 to be connected to the circuit board 926 (see FIG. 36). The circuit board 926 includes an inverter circuit for controlling the light emitting diodes 942. Further, the extraction hole 952 is opened at a position overlapped with the cover 922 described later. With this, dust and the like are prevented from entering the back cabinet 910 from the outside.

Next, the reflection sheet 930 is attached, which has a surface with light diffusion property, is curved in the vertical direction of the screen, and has holes larger in diameter than the lens 944 so as to insert the lenses 944 therethrough. Above the reflection sheet 930, the diffusion plate 946, a prism sheet 953, and a diffusion sheet 955, each having a thickness of 1.5 mm to 3 mm, are disposed. In the space (inner thickness Zd) between the substrate 938 and the rear surface of the diffusion plate 946, direct light from the light emitting diodes 942 and reflected light, which is secondary light, from the reflection sheet 930 are combined.

Next, the optical sheet group is fixed by the mold frame 904, which is made of a resin material and divided in quarters. Above the mold frame 904, the liquid crystal display panel 900 is disposed. The liquid crystal display panel 900 includes two glass substrates and liquid crystal sealed therebetween. One substrate (TFT substrate) includes thin film transistors (TFTs), drain signal lines, and gate signal lines, and the other substrate includes a color filter. The gate signal lines and the drain signal lines formed on the TFT substrate are pulled outside to be connected to a driver IC and a drain substrate on which the driver IC is mounted. On each surface of the glass substrates, a polarizing plate is adhered. The drain substrate is electrically connected to the timing control circuit for supplying the video signal via a flexible cable. Above the liquid crystal display panel 900, the upper frame 902 made of iron is attached, for blocking electromagnetic waves from the driver IC and fixing the liquid crystal display panel 900.

In order to finally complete the liquid crystal television set, the front cabinet 908 made of a resin material is attached to the surface of the upper frame 902. On the lower side of the cabinet 912, a control circuit for the light emitting diodes 942, a timing control circuit, a power supply circuit for supplying power to the video circuit, a connection terminal to the outside, and the like are disposed, and the cover 922 for protection, which is made of a resin, is attached.

Note that, in this embodiment, an example using the wall-mount bracket 948 is described, but when the back cabinet 910 is strong enough, the wall-mount bracket 948 may be omitted.

Tenth Embodiment

Figure 39:
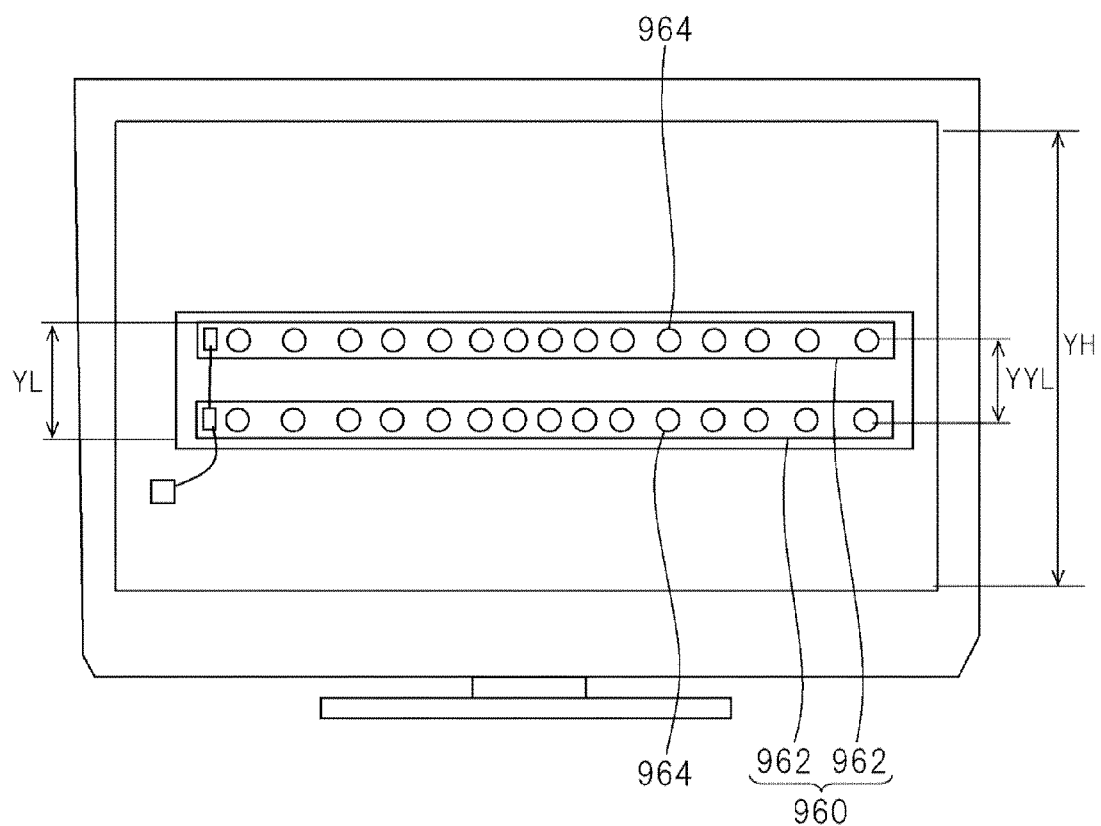
FIG. 39 is a view illustrating members provided behind a reflection sheet of a liquid crystal television set according to a tenth embodiment of the present invention.
Figure 40:
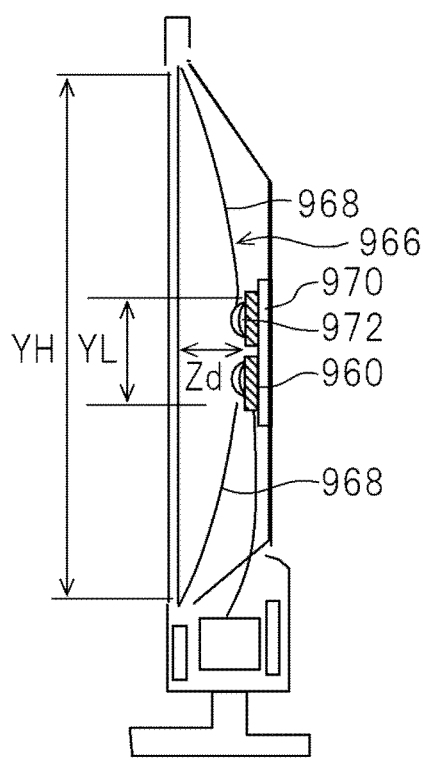
FIG. 40 is a schematic view of a vertical cross section of the liquid crystal television set.

FIG. 39 is a view illustrating members provided behind a reflection sheet of a liquid crystal television set according to a tenth embodiment of the present invention. FIG. 40 is a schematic view of a vertical cross section of the liquid crystal television set.

The liquid crystal television set according to this embodiment is larger in screen size than the liquid crystal television set of the ninth embodiment. Therefore, when all light emitting diodes 972 are mounted on one substrate, the substrate size increases, and therefore the cost increases. Therefore, in this embodiment, the substrate is divided into a plurality of parts. That is, a substrate 960 includes a plurality of divided substrates 962 arranged in the vertical direction of the screen.

Each of the plurality of divided substrates 962 includes light emitting diodes 972 mounted thereon, and adjacent divided substrates 962 has an interval provided therebetween so that an interval between the center points of the light emitting diodes 972 is YYL. The plurality of divided substrates 962 are fixed to a radiator plate 970. The dimension YYL is increased to a distance that unevenness does not occur in the vertical direction in the light distribution of the point light sources 964. Further, the liquid crystal television set of this embodiment does not mount the wall-mount bracket.

The width YL in the vertical direction of the space region where the plurality of point light sources 964 are stored is smaller than a distance obtained by subtracting the width YL from the vertical dimension of the screen, that is, a width in the vertical direction of the curved portion 968 of the reflection sheet 966. With this, there may be obtained a brightness distribution in which the brightness on the front side is high and the brightness smoothly decreases toward the periphery of the screen. In this distribution, brightness is lower at the periphery, but a comfortable brightness distribution is observed when seen from the front side. Therefore, it is possible to reduce the total light amount necessary for the liquid crystal television set, and hence the cost can be reduced.

As described above, in this embodiment, it is possible to reduce the cost of the liquid crystal television set having a screen larger than that of the ninth embodiment. Other contents of this embodiment correspond to the contents described in the ninth embodiment.

The present invention is not limited to the embodiments described above, and various modifications may be made thereto. For example, the structures described in the embodiments may be replaced by substantially the same structure, a structure having the same action and effect, and a structure which may achieve the same object.

What is claimed is:

1. A liquid crystal display device, comprising:
   a liquid crystal display panel having a display surface and a rear surface, which is on a side opposite to the display surface; and a backlight, wherein:
the backlight comprises:
a plurality of light emitting diodes;
a substrate on which all of the plurality of light emitting diodes are mounted;
a reflection sheet, which overlaps the substrate at a surface on which all of the plurality of light emitting diodes are mounted in a manner without overlapping the plurality of light emitting diodes;
the surface on which all of the plurality of light emitting diodes are mounted of the substrate is opposed to the rear surface of the liquid crystal display panel;
the liquid crystal display panel and the substrate each have a shape in which a common width in a first direction is longer than a width in a second direction, which is orthogonal to the first direction;
the width of the substrate in the second direction is shorter than the width of the liquid crystal display panel in the second direction, the substrate being opposed to, while avoiding being opposed to both end portions of the liquid crystal display panel in the second direction, a central portion between the both end portions of the liquid crystal display panel;
the substrate on which all of the plurality of light emitting diodes are mounted is only arranged opposite to the central portion of the liquid crystal display panel and not arranged opposite to the end portions of the liquid crystal display panel; and
a center line of the substrate on which all of the plurality of light emitting diodes are mounted extending in the first direction is substantially overlapped with a center line of the liquid crystal display panel extending in the first direction in plan view.

2. The liquid crystal display device according to claim 1, wherein the width of the substrate in the second direction is one-third the width of the liquid crystal display panel in the second direction or less.

3. The liquid crystal display device according to claim 1, wherein each of the liquid crystal display panel and the substrate has a rectangular shape which is long in the first direction.

4. The liquid crystal display device according to claim 1, wherein the plurality of light emitting diodes are arranged in a row in the first direction.

5. The liquid crystal display device according to claim 4, wherein pitches between adjacent light emitting diodes of the plurality of light emitting diodes are equal.

6. The liquid crystal display device according to claim 4, wherein pitches between adjacent light emitting diodes of the plurality of light emitting diodes are smaller as the adjacent light emitting diodes are closer to a center of the substrate in the first direction.

7. The liquid crystal display device according to claim 1, wherein the plurality of light emitting diodes are arranged in a staggered pattern in the first direction.

8. The liquid crystal display device according to claim 7, wherein pitches between adjacent light emitting diodes of the plurality of light emitting diodes in an arrangement direction of the staggered pattern are equal.

9. The liquid crystal display device according to claim 7, wherein pitches between adjacent light emitting diodes of the plurality of light emitting diodes in an arrangement direction of the staggered pattern are smaller as the adjacent light emitting diodes are closer to a center of the substrate in the first direction.

10. The liquid crystal display device according to claim 1, wherein the plurality of light emitting diodes comprise light emitting diodes in a first group, which are arranged in a row in the first direction, and light emitting diodes in a second group, which are arranged in a staggered pattern in the first direction.

11. The liquid crystal display device according to claim 10, wherein:
the light emitting diodes in the second group are disposed at a central portion of the substrate in the first direction; and
the light emitting diodes in the first group are respectively disposed at both end portions of the substrate, which sandwich the central portion.

12. The liquid crystal display device according to claim 11, wherein:
the light emitting diodes in the first group are arranged at equal pitches in the first direction; and
the light emitting diodes in the second group are arranged at equal pitches in an arrangement direction of the staggered pattern.

13. The liquid crystal display device according to claim 11, wherein:
pitches between adjacent light emitting diodes of the light emitting diodes in the first group are smaller as the adjacent light emitting diodes are closer to a center of the substrate in the first direction; and
pitches between adjacent light emitting diodes of the light emitting diodes in the second group in an arrangement direction of the staggered pattern are smaller as the adjacent light emitting diodes are closer to the center of the substrate in the first direction.

14. The liquid crystal display device according to claim 11, wherein a width of the substrate in the second direction at the central portion is larger than a width of the substrate in the second direction at each of the both end portions.

15. The liquid crystal display device according to claim 1, further comprising:
a support plate, which supports the substrate on a side opposite to the plurality of light emitting diodes and is larger in size than the substrate; and
a lens disposed above the substrate and above at least one of the plurality of light emitting diodes,
wherein the lens is attached to the support plate on an outer side of the substrate.

16. The liquid crystal display device according to claim 15, further comprising a spacer provided on the support plate,
wherein the lens is supported by the support plate through intermediation of the spacer.

17. The liquid crystal display device according to claim 1, further comprising:
a plurality of the substrates;
a support plate, which supports the plurality of the substrates on a side opposite to the plurality of light emitting diodes and is larger in size than the plurality of the substrates; and
a lens disposed above each of the plurality of the substrates and above at least one of the plurality of light emitting diodes,
wherein each of the lenses is attached to the support plate on an outer side of corresponding one of the plurality of the substrates disposed below the each of the lenses.

18. The liquid crystal display device according to claim 17, further comprising a spacer provided on the support plate,
wherein the lenses are supported by the support plate through intermediation of the spacer.

19. The liquid crystal display device according to claim 18, wherein:

the spacer is disposed at least without being divided between adjacent substrates of the plurality of the substrates; and both of the lens positioned above one of the adjacent substrates and the lens positioned above another of the adjacent substrates are supported by the spacer disposed between the adjacent substrates.

20. The liquid crystal display device according to claim 18, wherein:

the spacer is divided into at least a first divided spacer and a second divided spacer between adjacent substrates of the plurality of the substrates, the first divided spacer being disposed near one of the adjacent substrates, the second divided spacer being disposed near another of the adjacent substrates;

the lens positioned above the one of the adjacent substrates is supported by the first divided spacer; and the lens positioned above the another of the adjacent substrates is supported by the second divided spacer.

21. The liquid crystal display device according to claim 1, wherein the reflection sheet corresponding to a first reflection sheet has a curved portion.

22. A television set, comprising the liquid crystal display device according to claim 1, the television set being formed so as to receive a radio wave for television broadcast to display an image and output sound.

23. The liquid crystal display device according to claim 1, wherein the plurality of emitting diodes are arranged within a space region, and a width of the space region in the second direction of the liquid crystal display panel is no greater than half of the width of the liquid crystal display panel in the second direction.

\* \* \* \* \*